United States Patent
Morad et al.

(10) Patent No.: US 9,266,548 B1
(45) Date of Patent: *Feb. 23, 2016

(54) COMBINATION TRASH CAN DOLLY AND MOP BUCKET AND COMBINATION JANITORIAL CART AND MOP BUCKET

(75) Inventors: Fred I. Morad, Toluca Lake, CA (US); William P. Camp, Jr., Vanlue, OH (US)

(73) Assignee: Worldwide Integrated Resources, Inc., Montebello, CA (US)

(*) Notice: Subject to any disclaimer, the term of this patent is extended or adjusted under 35 U.S.C. 154(b) by 257 days.

This patent is subject to a terminal disclaimer.

(21) Appl. No.: 13/584,453

(22) Filed: Aug. 13, 2012

Related U.S. Application Data

(63) Continuation-in-part of application No. 12/800,623, filed on May 18, 2010, now Pat. No. 8,256,778.

(51) Int. Cl.
*B62B 3/00* (2006.01)
*B62B 3/10* (2006.01)
*B62B 5/00* (2006.01)

(52) U.S. Cl.
CPC ............... *B62B 3/008* (2013.01); *B62B 3/104* (2013.01); *B62B 5/0083* (2013.01); *B62B 2202/028* (2013.01); *B62B 2202/20* (2013.01); *B62B 2207/02* (2013.01)

(58) Field of Classification Search
CPC ............ B62B 3/008; B62B 3/02; B62B 3/04; B62B 3/10; B62B 2202/20; B62B 2202/50; B62B 2203/40; B62B 2205/006; B62B 2207/02

USPC ......... 280/79.11, 79.2, 79.5, 47.35, 483, 489, 280/508, 510

See application file for complete search history.

(56) References Cited

U.S. PATENT DOCUMENTS

| | | | |
|---|---|---|---|
| 5,110,147 A * | 5/1992 | Gershman | 280/79.5 |
| 5,117,521 A * | 6/1992 | Foster et al. | 5/510 |
| 5,184,836 A * | 2/1993 | Andrews et al. | 280/79.5 |
| 5,337,845 A * | 8/1994 | Foster et al. | 180/11 |
| 5,758,888 A * | 6/1998 | Burgan et al. | 280/47.34 |
| 5,860,659 A * | 1/1999 | Hart | 280/79.5 |
| 6,135,467 A * | 10/2000 | Tagariello | 280/79.5 |
| 6,669,224 B2 * | 12/2003 | Newkirk | 280/508 |
| 6,698,770 B2 * | 3/2004 | Eriksson et al. | 280/33.991 |
| 7,104,556 B1 * | 9/2006 | Young | 280/47.35 |
| 7,648,147 B2 * | 1/2010 | Lauer et al. | 280/47.35 |
| 7,758,055 B2 * | 7/2010 | Martinez | 280/79.5 |
| 7,954,830 B2 * | 6/2011 | Begin et al. | 280/47.35 |
| 2003/0020261 A1 * | 1/2003 | Perelli et al. | 280/651 |
| 2007/0267832 A1 * | 11/2007 | Denissov | 280/47.35 |
| 2010/0000042 A1 * | 1/2010 | Fischer et al. | 15/261 |
| 2010/0230920 A1 * | 9/2010 | Thibault | 280/79.11 |
| 2011/0121530 A1 * | 5/2011 | Young | 280/47.35 |
| 2011/0133417 A1 * | 6/2011 | Rouillard et al. | 280/35 |

* cited by examiner

*Primary Examiner* — Katy M Ebner
(74) *Attorney, Agent, or Firm* — Thomas I. Rozsa

(57) ABSTRACT

A unique attachment mechanism whereby a base platform of a janitorial cart can be affixed to the underside of a mop bucket by an interconnection mechanism by a simple rolling motion so that it is not necessary to lift a heavy mop bucket filled with water to interconnect the mop bucket and the base platform of a janitorial cart.

6 Claims, 18 Drawing Sheets

COMBINATION TRASH CAN DOLLY AND MOP BUCKET AND COMBINATION JANITORIAL CART AND MOP BUCKET

This is a continuation-in-part of patent application Ser. No. 12/800,623 filed on May 18, 2010.

BACKGROUND OF THE INVENTION

1. Field of the Invention

The present invention relates to the field of janitorial supplies and in particular to a rolling dolly on which a trash can is retained or alternatively to a janitorial cart used by a cleaning person when performing janitorial cleaning services, usually in a commercial building, combined with a rolling mop bucket which retains water and cleaning solution so that a mop is placed into the bucket and the water and cleaning solution are absorbed onto the mop strands which is then used to clean a floor.

2. Description of the Prior Art

In general, rolling dollies on which a trash can is retained are known in the prior art. Rolling mop buckets are also known in the prior art. When a janitor uses both, the janitor must separately roll the mop bucket to the location where cleaning is to be performed and separately roll the trash can dolly to the location where cleaning is to be performed.

Janitorial carts are also known in the prior art. Rolling mop buckets are also known in the prior art. When a janitor uses both, the janitor must separately roll the mop bucket to the location where cleaning it to be performed and separately roll the janitorial cart to the location where cleaning is to be performed.

There is a significant need to provide a mechanism wherein the trash can dolly and mop bucket can be efficiently linked together so that both can be simultaneously rolled to a location where cleaning is to be performed. There is also a significant need for a mechanism wherein the janitorial cart and mop bucket can be efficiently linked together so that both can be simultaneously rolled to a location where cleaning is to be performed.

SUMMARY OF THE INVENTION

The present invention is a unique attachment mechanism whereby a trash can dolly can be affixed to the underside of a mop bucket by an interconnection mechanism by a simple rolling motion so that it is not necessary to lift a heavy mop bucket filled with water to interconnect the mop bucket and the trash can dolly.

A problem with prior art designs is that there is a method for interconnecting the trash can dolly and the mop bucket but this requires that the mop bucket be lifted to be inserted over the interconnecting member from the trash can dolly. After the mop bucket is filled with water and cleaning fluids and has the wringer on it, it is a heavy object and therefore, would provide stress on the janitor to lift the mop bucket over the interconnecting member with the trash can dolly.

It is an object of the present invention to provide an interconnecting mechanism which can be lowered by an activation means such as a foot depressing on the interconnecting member so that the interconnecting member can be placed into a position beneath the mop bucket and when the force on the activation means is released, then mechanisms on the interconnecting member can be affixed to a portion of the mop bucket so that the trash can dolly and the mop bucket are retained together.

It is a further object of the present invention to provide an interconnecting member having a ramp section with a downwardly extending inclined angle so that the ability of the ramp section to be pushed under the mop bucket is facilitated by the downwardly extending angle extending downwardly from the trash can dolly to the mop bucket.

It is a further object of the present invention to provide an interconnecting member having a return force means such as return springs which enable the interconnecting ramp to be in line with the trash can dolly and enable an activation force to overcome the force of interconnecting springs so that the ramp section is lowered to be placed into a location under the mop bucket and when the activation force is released, the return force causes the ramp section to be engaged with at least one portion of the mop bucket so that the trash can dolly and the mop bucket are retained together by a simple rolling motion of the trash can dolly relative to the mop bucket and without requiring that the mop bucket be lifted to the interconnecting member.

It is also an object of the present invention to provide retaining means on the mop bucket which includes at least one downwardly extending sidewall and preferably a front base wall, a rear base wall, a first sidewall and a second sidewall which can be respectively engaged by the ramp section of the interconnecting member.

It is also an object of the present invention to provide a transverse slot in the ramp section of the interconnecting member which has a given height and thickness sufficient to engage and retain a selective one of the mop bucket engaging members which include a front base wall, a rear base wall, a first sidewall and a second sidewall.

When the ramp of the interconnecting member from the trash can dolly is engaged with the mop bucket, the distance of movement from left to right on the front of the dolly or the back of the dolly is small enough that there probably will not be movement of the trash can dolly relative to the mop bucket. However, on the sidewalls, there is a sufficient distance so that even if engaged with a transverse slot engaging a first downward sidewall or second downward sidewall, the trash can dolly can move relative to the mop bucket in a side to side motion.

Therefore, an additional object of the present invention is to provide a retaining rib which extends transversely from the front base wall, the rear base wall and both of the sidewalls in a direction toward the center of the base for a given length so that the ramp section, in addition to having the transverse groove, also has a longitudinal groove which concurrently engages the selected retaining rib. Therefore, by engagement of the retaining rib in the longitudinal member, the trash can dolly is prevented from moving side to side as well as being retained by the transverse rib. Accordingly, through use of the present invention, the trash can dolly can be retained underneath the front, the back or either side of the mop bucket by engagement of a transverse rib engaging and retaining one of the sidewalls or front or rear wall of the mop bucket and the longitudinal rib engaging the retaining rib which extends transversely from the front wall, back wall and sidewalls so that the trash can dolly is securely retained with the mop bucket and both mop bucket and trash can dolly can be rolled to any convenient cleaning location without requiring the janitor to lift the heavy mop bucket to cause an engagement with the trash can dolly.

It is a further object of the present invention to provide a means for quickly and efficiently engaging a trash can dolly with a mop bucket without requiring the lifting of either the trash can dolly or the mop bucket to facilitate the engagement.

It is a further object of the present invention to provide a combination trash can dolly and mop bucket wherein the trash can dolly can be engaged at any desired location on the mop bucket in the front of the mop bucket, in the rear of the mop bucket or on either side of the mop bucket and the trash can dolly and the mop bucket can be rolled to a convenient location where the mop bucket is already filled with cleaning liquid and water and the trash can dolly is retaining a trash can thereon.

While in the preferred embodiment, the length of the respective retaining ribs are the same, it is within the spirit and scope of the present invention for each retaining rib extending from the front base wall, the rear base wall and either of the two sidewalls to be of different heights and lengths. However, a key innovation is that the engaging member on the trash can dolly must be of sufficient height and length to engage the retaining rib. Accordingly, in the preferred embodiment, the retaining ribs are all of the same thickness and height so that they can each individually be separately retained for engagement with the longitudinal channel set within the ramp section on the trash can dolly.

In addition, it is preferred that the thickness and height of the front base wall, rear base wall and both sidewalls of the trash can dolly be the same so that each one can be selectively retained within a transverse channel in the ramp section of the trash can dolly so that a janitor can select any desired side of the mop bucket to be retained by the trash can dolly so the two can be conveniently rolled to a cleaning location.

The present invention is an apparatus for engaging a trash can dolly with a mop bucket comprising: (a) the trash can dolly including a body with an upper surface with means to retain a trash can thereon, a lower surface with means to retain a multiplicity of spaced apart rolling wheels to enable the trash can dolly to be rolled from one location to another; (b) the mop bucket having upper sidewalls surrounding an upper surface of a base to form a chamber for retaining liquid, the base having means to retain a multiplicity of spaced apart rolling wheels to enable the mop bucket to be rolled from one location to another; (c) the base of the mop bucket having a lower surface having a front base wall of a given first height and a given first thickness, a first retaining rib extending transversely from an interior wall of the front base wall for a given second distance toward a center of the mop bucket with the first retaining rib having a given second thickness, a rear base wall of the given first height and the given first thickness, a second retaining rib extending transversely from an interior wall of the rear base wall for the given second distance toward a center of the mop bucket with the second retaining rib having the given second thickness, a first sidewall of the given first height and the given first thickness, a first side retaining rib extending transversely from an interior wall of the first sidewall for the given second distance toward a center of the mop bucket with the first side retaining rib having the given second thickness, a second sidewall of the given first height and the given first thickness, a second side retaining rib extending transversely from an interior wall of the second sidewall for the given second distance toward a center of the mop bucket with the second side retaining rib having the given second thickness, the front base wall, rear base wall, first sidewall and second sidewall all aligned and all extending in a direction away from the lower surface of the base and in a direction away from the liquid retaining chamber; and (d) the trash can dolly having an interconnecting section including a fixed section affixed to the body of the trash can dolly and having a top surface aligned with the top surface of the body of the trash can dolly, the interconnecting section having a movable section rotatably affixed adjacent one end to the fixed section, the interconnecting section having a protruding ramp section at a location remote from where the movable section is rotatably affixed, the protruding section having an inclined top surface extending at a downward angle away from and relative to the top surface of the fixed section, the ramp section having a longitudinal centrally disposed channel having a sufficient depth and width to receive and retain any one of the retaining ribs of the mop bucket and a transverse channel of sufficient depth and width to receive and retain any one of the front base wall, rear base wall, first sidewall and second sidewall of the mop bucket, the movable second section having return spring means affixed between a lower surface of the movable section and an upper surface of the fixed section and providing a return spring force to retain the movable section against the fixed section, the movable section having at least one foot activated button accessible from a location in or adjacent the interconnecting section so that a downward force on the at least one foot activated button to overcome the return spring force enables the ramp section rotate to a location below the mop bucket so that after the force on the foot activated button is released, the return spring force returns the movable section to its original location and at least one retaining rib is engaged within and retained in the longitudinal centrally disposed channel at least one of the front base wall, rear base wall, first sidewall and second sidewall is engaged within and retained in the transverse channel.

The present invention is a unique attachment mechanism whereby a the base platform of a janitorial cart can be affixed to the underside of a mop bucket by an interconnection mechanism by a simple rolling motion so that it is not necessary to lift a heavy mop bucket filled with water to interconnect the mop bucket and the base platform of a janitorial cart.

A problem with prior art designs is that there is a method for interconnecting the base platform of a janitorial cart and the mop bucket but this requires that the mop bucket be lifted to be inserted over the interconnecting member from the base platform of the janitorial cart. After the mop bucket is filled with water and cleaning fluids and has the wringer on it, it is a heavy object and therefore, would provide stress on the janitor to lift the mop bucket over the interconnecting member with the base platform of the janitorial cart.

It is an object of the present invention to provide an interconnecting mechanism which can be lowered by an activation means such as a foot depressing on the interconnecting member so that the interconnecting member can be placed into a position beneath the mop bucket and when the force on the activation means is released, then mechanisms on the interconnecting member can be affixed to a portion of the mop bucket so that the base platform of the janitorial cart and the mop bucket are retained together.

It is a further object of the present invention to provide an interconnecting member having a ramp section with a downwardly extending inclined angle so that the ability of the ramp section to be pushed under the mop bucket is facilitated by the downwardly extending angle extending downwardly from the base platform of the janitorial cart to the mop bucket.

It is a further object of the present invention to provide an interconnecting member having a return force means such as return springs which enable the interconnecting ramp to be in line with the base platform of the janitorial cart and enable an activation force to overcome the force of interconnecting springs so that the ramp section is lowered to be placed into a location under the mop bucket and when the activation force is released, the return force causes the ramp section to be engaged with at least one portion of the mop bucket so that the base platform of the janitorial cart and the mop bucket are retained together by a simple rolling motion of the janitorial cart relative to the mop bucket and without requiring that the mop bucket be lifted to the interconnecting member.

It is also an object of the present invention to provide retaining means on the mop bucket which includes at least one downwardly extending sidewall and preferably a front base wall, a rear base wall, a first sidewall and a second sidewall which can be respectively engaged by the ramp section of the interconnecting member.

It is also an object of the present invention to provide a transverse slot in the ramp section of the interconnecting member which has a given height and thickness sufficient to engage and retain a selective one of the mop bucket engaging members which include a front base wall, a rear base wall, a first sidewall and a second sidewall.

When the ramp of the interconnecting member from the base platform of the janitorial cart is engaged with the mop bucket, the distance of movement from left to right on the front of the base platform or the back of the base platform is small enough that there probably will not be movement of the trash can dolly relative to the base platform of the janitorial cart. However, on the sidewalls, there is a sufficient distance so that even if engaged with a transverse slot engaging a first downward sidewall or second downward sidewall, the base platform of the janitorial cart can move relative to the mop bucket in a side to side motion.

Therefore, an additional object of the present invention is to provide a retaining rib which extends transversely from the front base wall, the rear base wall and both of the sidewalls in a direction toward the center of the base for a given length so that the ramp section, in addition to having the transverse groove, also has a longitudinal groove which concurrently engages the selected retaining rib. Therefore, by engagement of the retaining rib in the longitudinal member, the base platform of the janitorial cart is prevented from moving side to side as well as being retained by the transverse rib. Accordingly, through use of the present invention, the base platform of the janitorial cart can be retained underneath the front, the back or either side of the mop bucket by engagement of a transverse rib engaging and retaining one of the sidewalls or front or rear wall of the mop bucket and the longitudinal rib engaging the retaining rib which extends transversely from the front wall, back wall and sidewalls so that the base platform of the janitorial cart is securely retained with the mop bucket and both mop bucket and janitorial cart can be rolled to any convenient cleaning location without requiring the janitor to lift the heavy mop bucket to cause an engagement with the base platform of the janitorial cart.

It is a further object of the present invention to provide a means for quickly and efficiently engaging a base platform of a janitorial cart with a mop bucket without requiring the lifting of either the base platform of the janitorial cart or the mop bucket to facilitate the engagement.

It is a further object of the present invention to provide a combination janitorial cart and mop bucket wherein the base platform of the janitorial cart can be engaged at any desired location on the mop bucket in the front of the mop bucket, in the rear of the mop bucket or on either side of the mop bucket and the janitorial cart and the mop bucket can be rolled to a convenient location where the mop bucket is already filled with cleaning liquid and water and the base of the janitorial cart includes the full janitorial cart.

While in the preferred embodiment, the length of the respective retaining ribs are the same, it is within the spirit and scope of the present invention for each retaining rib extending from the front base wall, the rear base wall and either of the two sidewalls to be of different heights and lengths. However, a key innovation is that the engaging member on the base platform of the janitorial cart must be of sufficient height and length to engage the retaining rib. Accordingly, in the preferred embodiment, the retaining ribs are all of the same thickness and height so that they can each individually be separately retained for engagement with the longitudinal channel set within the ramp section on the base platform of the janitorial cart.

In addition, it is preferred that the thickness and height of the front base wall, rear base wall and both sidewalls of the base platform of the janitorial cart be the same so that each one can be selectively retained within a transverse channel in the ramp section of the base platform of the janitorial cart so that a janitor can select any desired side of the mop bucket to be retained by the base platform of the janitorial cart so the two can be conveniently rolled to a cleaning location.

The present invention is an apparatus for engaging a base platform of a janitorial cart with a mop bucket comprising: (a) the base platform of a janitorial cart including a body with an upper surface with means to retain a trash can thereon, a lower surface with means to retain a multiplicity of spaced apart rolling wheels to enable the base platform of a janitorial cart to be rolled from one location to another; (b) the mop bucket having upper sidewalls surrounding an upper surface of a base to form a chamber for retaining liquid, the base having means to retain a multiplicity of spaced apart rolling wheels to enable the mop bucket to be rolled from one location to another; (c) the base of the mop bucket having a lower surface having a front base wall of a given first height and a given first thickness, a first retaining rib extending transversely from an interior wall of the front base wall for a given second distance toward a center of the mop bucket with the first retaining rib having a given second thickness, a rear base wall of the given first height and the given first thickness, a second retaining rib extending transversely from an interior wall of the rear base wall for the given second distance toward a center of the mop bucket with the second retaining rib having the given second thickness, a first sidewall of the given first height and the given first thickness, a first side retaining rib extending transversely from an interior wall of the first sidewall for the given second distance toward a center of the mop bucket with the first side retaining rib having the given second thickness, a second sidewall of the given first height and the given first thickness, a second side retaining rib extending transversely from an interior wall of the second sidewall for the given second distance toward a center of the mop bucket with the second side retaining rib having the given second thickness, the front base wall, rear base wall, first sidewall and second sidewall all aligned and all extending in a direction away from the lower surface of the base and in a direction away from the liquid retaining chamber; and (d) the base platform of a janitorial cart having an interconnecting section including a fixed section affixed to the body of the base platform of a janitorial cart and having a top surface aligned with the top surface of the body of the base platform of a janitorial cart, the interconnecting section having a movable section rotatably affixed adjacent one end to the fixed section, the interconnecting section having a protruding ramp section at a location remote from where the movable section is rotatably affixed, the protruding section having an inclined top surface extending at a downward angle away from and relative to the top surface of the fixed section, the ramp section having a longitudinal centrally disposed channel having a sufficient depth and width to receive and retain any one of the retaining ribs of the mop bucket and a transverse channel of sufficient depth and width to receive and retain any one of the front base wall, rear base wall, first sidewall and second sidewall of the mop bucket, the movable second section having at least one return spring to provide a force to retain the movable section against the fixed section, a relative rolling motion of the base platform of a janitorial cart and the mop bucket enables the ramp section to come in contact with at least one retaining rib so that a force of at least one retaining rib against the ramp section overcomes the force of the at least one return spring and causes the moveable section to rotate so that the ramp section is rotated to a location below the mop bucket so that after the ramp section is moved to a location further under the mop bucket than a given length of the at least one retaining rib, the force of the at least one retaining rib against the ramp section is released and the force of the at least one return spring returns the moveable section to its original location and the at least one retaining rib is engaged within and retained in the longitudinal centrally disposed channel of the ramp section and at least one of the front base wall, rear base wall, first sidewall and second sidewall is engaged within and retained in the transverse channel.

The present invention is also an apparatus for engaging a base platform of a janitorial cart with a mop bucket in accordance with claim 1, further comprising: (a) the movable section having at least one foot activated button accessible from a location in or adjacent the interconnecting section so that a downward force on the at least one foot activated button to overcome the force of the at least one return spring enables the ramp section to be released from its engagement with a retaining rib and at least one of the front base wall, rear base wall, first sidewall and second sidewall so that the base platform of a janitorial cart and mop bucket are rolled relative to each other to be disengaged from each other.

Described more broadly, the present invention is an apparatus for engaging a base platform of a janitorial cart with a mop bucket comprising: (a) the base platform of a janitorial cart including a body with an upper surface with means to retain a trash can thereon, a lower surface with means to retain a multiplicity of spaced apart rolling wheels to enable the base platform of a janitorial cart to be rolled from one location to another; (b) the mop bucket having upper sidewalls surrounding an upper surface of a base to form a chamber for retaining liquid, the base having means to retain a multiplicity of spaced apart rolling wheels to enable the mop bucket to be rolled from one location to another; (c) the base of the mop bucket having a lower surface having at least one base wall and a retaining rib selected from the group consisting of a front base wall, of a given height and a given thickness with a first retaining rib extending transversely from an interior wall of the front base wall for a given distance toward a center of the mop bucket with the first retaining rib having a given thickness, a rear base wall of a given height and a given thickness and a second retaining rib extending transversely from an interior wall of the rear base wall for a given distance toward a center of the mop bucket with the second retaining rib having a given thickness, a first sidewall of a given height and a given thickness with a first side retaining rib extending transversely from an interior wall of the first sidewall for a given distance toward a center of the mop bucket with the first side retaining rib having a given thickness, a second sidewall of a given height and a given thickness with a second side retaining rib extending transversely from an interior wall of the second sidewall for a given distance toward a center of the mop bucket with the second side retaining rib having a given second thickness, the front base wall, rear base wall, first sidewall and second sidewall all aligned and all extending in a direction away from the lower surface of the base and in a direction away from the liquid retaining chamber; and (d) the base platform of a janitorial cart having an interconnecting section including a fixed section affixed to the body of the base platform of a janitorial cart and having a top surface, the interconnecting section having a movable section rotatably affixed to the fixed section, the interconnecting section having a protruding ramp section at a location remote from where the movable section is rotatably affixed and a longitudinal channel having a sufficient depth and width to receive and retain any one of the retaining ribs of the mop bucket and a transverse channel of sufficient depth and width to receive and retain any one of the front base wall, rear base wall, first sidewall and second sidewall of the mop bucket, the movable second section having return means to provide a force to retain the movable section against the fixed section, a relative rolling motion of the base platform of a janitorial cart and the mop bucket enables the ramp section to come in contact with at least one retaining rib so that a force of at least one retaining rib against the ramp section overcomes the force of the return means and causes the moveable section to rotate so that the ramp section is rotated to a location below the mop bucket so that after the ramp section is moved to a location further under the mop bucket than a given length of the at least one retaining rib, the force of the at least one retaining rib against the ramp section is released and the force of the return means returns the moveable section to its original location and the at least one retaining rib is engaged within and retained in the longitudinal channel and at least one of the front base wall, rear base wall, first sidewall and second sidewall is engaged within and retained in the transverse channel.

Described more broadly, the present invention an apparatus for engaging a base platform of a janitorial cart with a mop bucket comprising: (a) the base platform of a janitorial cart including a body with means to retain a trash can and means to enable the base platform of a janitorial cart to be rolled from one location to another; (b) the mop bucket having a liquid retaining chamber including a base and means to enable the mop bucket to be rolled from one location to another; (c) the base of the mop bucket having a lower surface having at least one base wall selected from the group consisting of a front base wall having a first given length, a rear base wall having a second given length, a first sidewall having a third given length and a second sidewall having a fourth given length, the front base wall, rear base wall, first sidewall and second sidewall all aligned and all extending in a direction away from the lower surface of the base and in a direction away from the liquid retaining chamber; (d) the base platform of a janitorial cart having an interconnecting section including a fixed section affixed to the body of the base platform of a janitorial cart and having a top surface, the interconnecting section having a movable section rotatably affixed to the fixed section, the interconnecting section having a protruding ramp section at a location remote from where the movable section is rotatably affixed and a transverse channel of sufficient depth, width and channel length extending for a width of the ramp, the channel open at both ends of the channel to enable the channel to receive and retain any one of a portion of the given length of the front base wall, rear base wall, first sidewall and second sidewall of the mop bucket, the movable second section having return means to provide a force to retain the movable section against the fixed section, a relative rolling motion of the base platform of a janitorial cart and the mop bucket enables the ramp section to come in contact with at least one of the front base wall, rear base wall, first sidewall and second sidewall so that a force from at least one of the front base wall, rear base wall, first sidewall and second sidewall against the ramp section overcomes the force of the return means and causes the moveable section to rotate so that the ramp section is rotated to a location below the mop bucket so that the ramp section is moved to a location where the at least one of the front base wall, rear base wall, first sidewall or second sidewall is engaged into the transverse channel of the ramp section without having to lift the mop bucket so that the force against the ramp section is released and the return means force returns the movable section to its original location; (e) the base of the mop bucket having a lower surface having at least one adjoining retaining rib transversely extending from an interior wall of at least one of the group consisting of the front base wall, the rear base wall, the first sidewall and the second sidewall, the at least one retaining rib having a given height and thickness and extension for a given distance toward a center of the mop bucket; and (f) the movable section of the interconnecting member further comprising a longitudinal channel in the ramp having a sufficient depth and width to receive and retain any one of the retaining ribs of the mop bucket so that after the mop bucket is moved so that the ramp section extends to a location under the mop bucket further than the length of the at least one retaining rib, the at least one retaining rib is engaged within and retained in the longitudinal channel.

Described even more broadly, the present invention is an apparatus for engaging a base platform of a janitorial cart with a mop bucket comprising: (a) the base platform of a janitorial cart including a body with an upper surface with means to retain a trash can thereon, a lower surface with means to retain a multiplicity of spaced apart rolling wheels to enable the base platform of a janitorial cart to be rolled from one location to another; (b) the mop bucket having upper sidewalls surrounding an upper surface of a base to form a chamber for retaining liquid, the base having means to retain a multiplicity of spaced apart rolling wheels to enable the mop bucket to be rolled from one location to another; (c) the base of the mop bucket having a lower surface having at least one base wall and a retaining rib extending transversely from an interior wall of the at least one base wall for a given distance toward a center of the mop bucket; and (d) the base platform of a janitorial cart having an interconnecting section including at least a movable section rotatably affixed to the base platform of a janitorial cart and having a protruding ramp section having a longitudinal channel having a sufficient depth and width to receive and retain the retaining rib of the mop bucket and a transverse channel of sufficient depth and width to receive and retain the at least one base wall, return force means to provide a force to retain the movable section against the base platform of a janitorial cart, a relative rolling motion of the base platform of a janitorial cart and the mop bucket enables the ramp section to come in contact with the retaining rib so that a force of at least one retaining rib against the ramp section overcomes the force of the return means and causes the moveable section to rotate so that the ramp section is rotated to a location below the mop bucket so that after the ramp section is moved to a location further under the mop bucket than a given length of the retaining rib, the force of the retaining rib against the ramp section is released and the force of the return means returns the moveable section to its original location and the retaining rib is engaged within and retained in the longitudinal channel and at least one base wall is engaged within and retained in the transverse channel Described even more broadly, the present invention is an apparatus for engaging a base platform of a janitorial cart with a mop bucket comprising: (a) the base platform of a janitorial cart including a body with an upper surface with means to retain a trash can thereon, a lower surface with means to retain a multiplicity of spaced apart rolling wheels to enable the base platform of a janitorial cart to be rolled from one location to another; (b) the mop bucket having upper sidewalls surrounding an upper surface of a base to form a chamber for retaining liquid, the base having means to retain a multiplicity of spaced apart rolling wheels to enable the mop bucket to be rolled from one location to another; (c) the base of the mop bucket having a lower surface having at least one base wall; (d) the base platform of a janitorial cart having an interconnecting section including at least a movable section rotatably affixed to the base platform of a janitorial cart and having a protruding ramp section having a transverse channel of sufficient depth, width and channel length with the channel open at both ends to enable the channel to receive and retain that at least one base wall of any given length, return force means to provide a force to retain the movable section against the base platform of a janitorial cart, the movable section having at least one accessible activation means so that a downward force on the at least one activation means to overcome the return force enables the ramp section to rotate to a location below the mop bucket without having to lift the mop bucket so that after the force on the activation means is released, the return force returns the movable section to its original location and the at least one base wall is engaged within and retained in the transverse channel; (e) the base of the mop bucket having a lower surface having at least one adjoining retaining rib transversely extending form an interior wall of the at least one base wall, the at least one retaining rib having a given height and thickness and extending for a given distance toward a center of the mop bucket; and (f) the movable section of the interconnecting member farther comprising a longitudinal channel in the ramp having a sufficient depth and width to receive and retain the at least one retaining rib of the mop bucket so that after the mop bucket is moved so that the ramp section extends to a location under the mop bucket further than the length of the at least one retaining rib, the at least one retaining rib is engaged within and retained in the longitudinal channel.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DETAILED DESCRIPTION OF THE PREFERRED EMBODIMENTS

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 9:
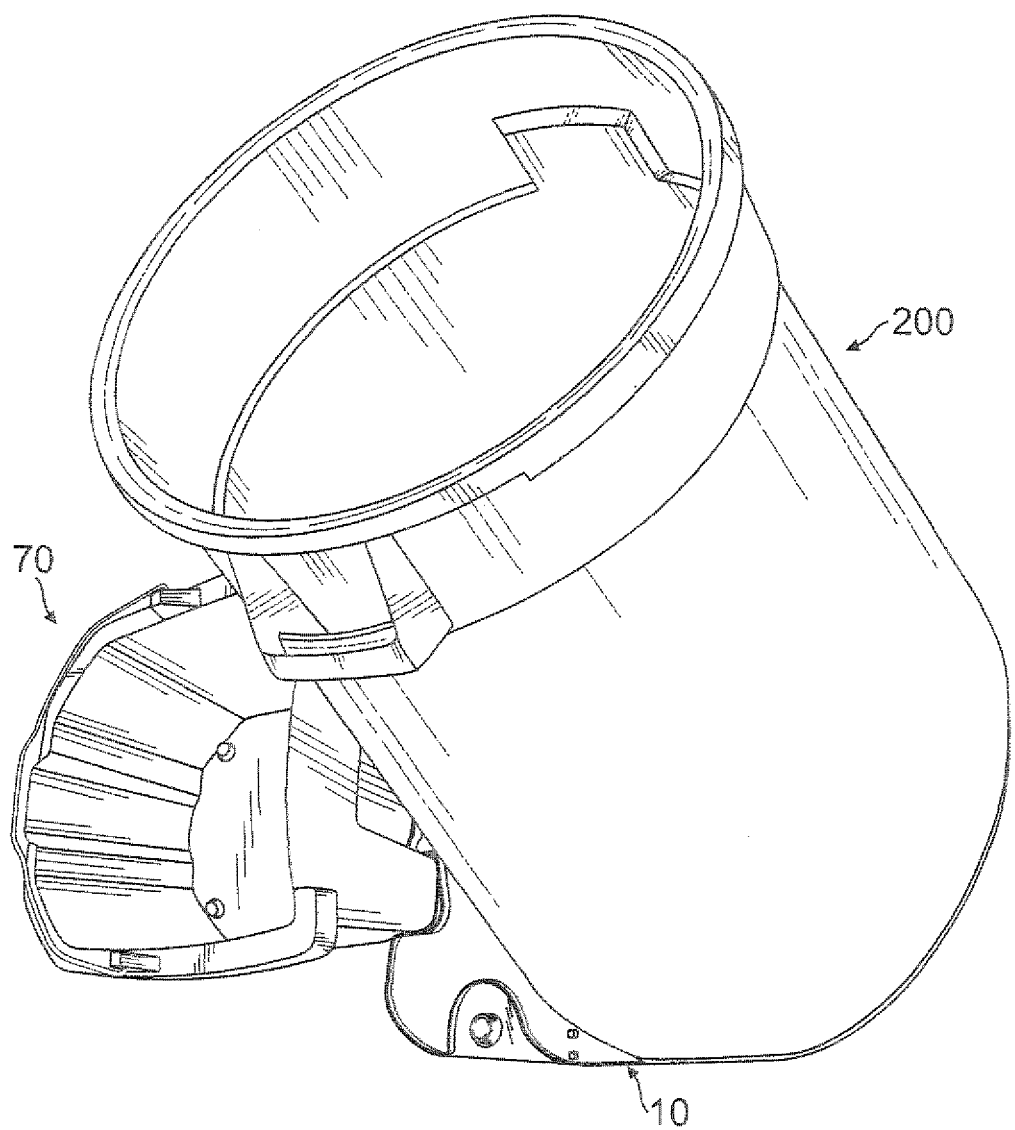
FIG. 9 is a top perspective view of the present invention trash can dolly connected to the rear base wall of the present invention mop bucket, also illustrating a trash can retained on the trash can dolly.
Figure 10:
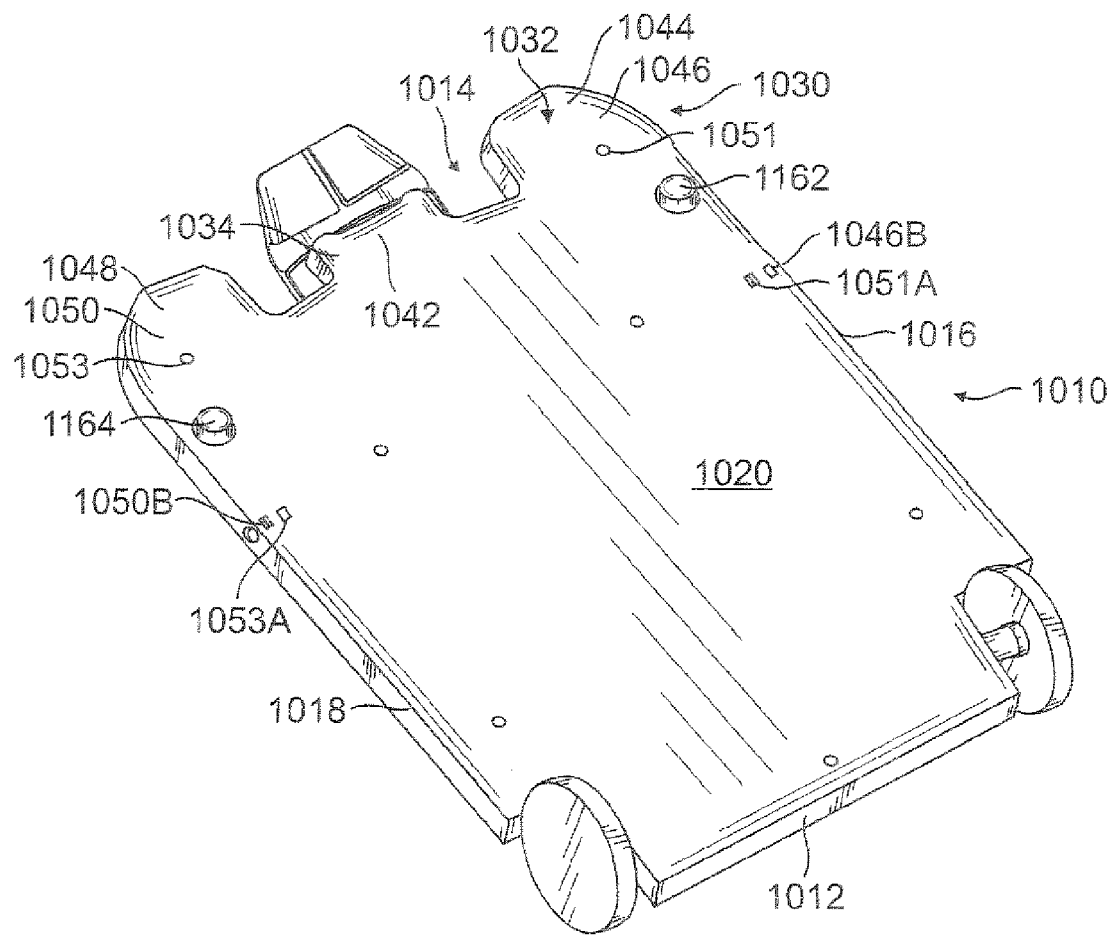
FIG. 10 is a top perspective view of the present invention base platform of a janitorial cart and attached interconnecting member.
Figure 11:
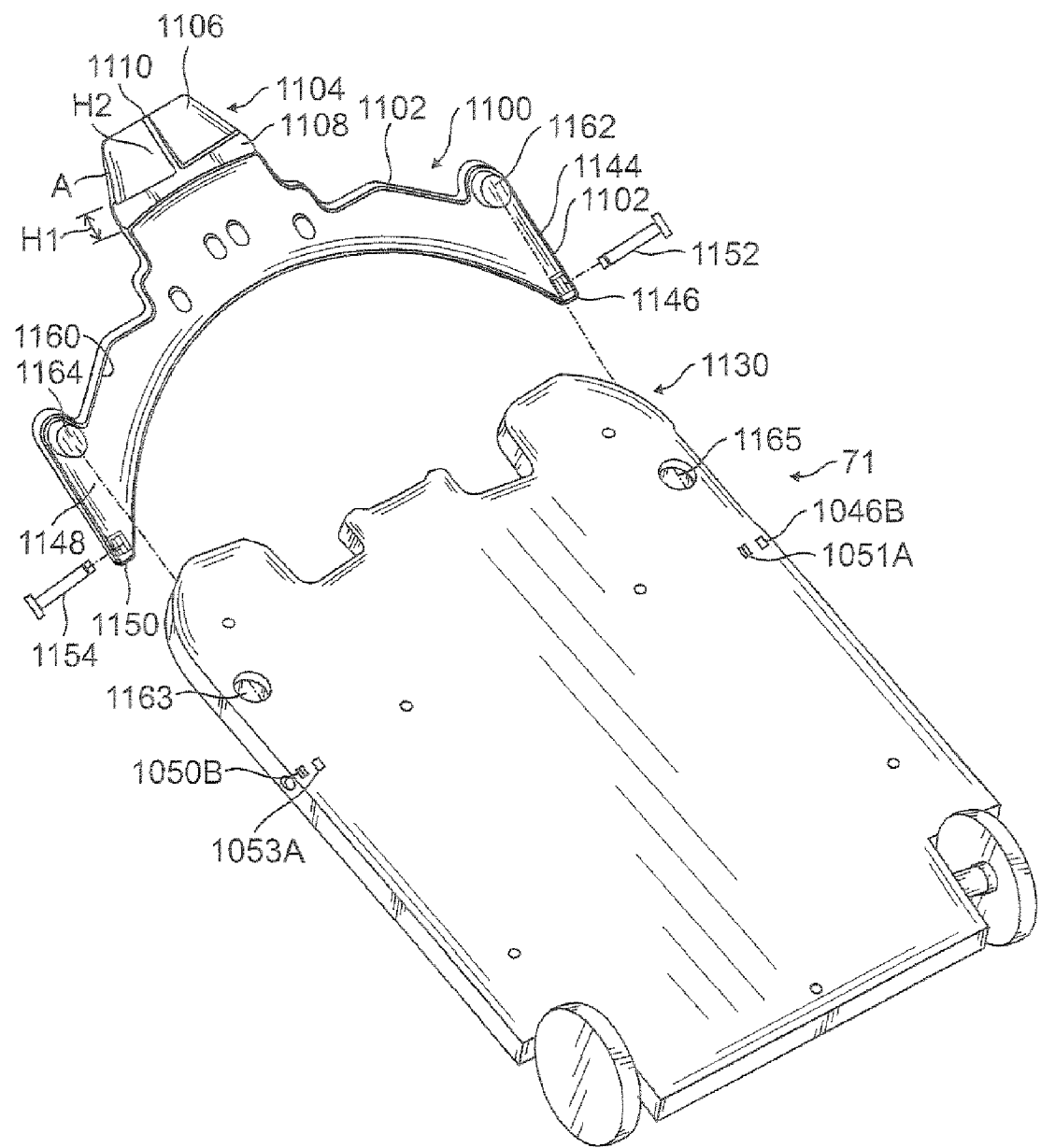
FIG. 11 is an exploded top perspective view of the present invention base platform of a janitorial cart with the interconnecting member removed.

Referring to FIGS. 1 through 4, there is illustrated a preferred embodiment of the present invention trash can dolly with unique features which enable it to be linked to a mop bucket. The trash can dolly 10 has a trash can retaining section 20 which includes an upper surface 130 having a flat section 132 on which the base of a trash can 200 (See FIG. 9) rests. The trash can retaining section 130 also has a central support member 134 having a circumferential wall 136 which extends above the flat surface 132, and terminates in an upper surface 138 having a central recess 140. The circumferential wall 136 has a multiplicity of spaced apart interlocking members of which 133 and 135 are shown. A trash can has an interior section which rests on the central support member 134 and interlocks with the interlocking members 133 and 135 to stabilize the trash can as it rests on the flat surface 130 of the trash can retaining section 20 so that it will not fall off the dolly as it is being rolled from one location to another and will not tip over when trash is placed into the trash can. This portion is a standard feature of trash can dollies and is not unique to the present invention. The lower surface 148 of trash can retaining section 130 has a multiplicity of spaced apart wheel retaining assemblies including wheel support bracket retaining members 150, 152, 154, 156 and 158 which respectively receive a wheel support bracket 160, 162, 164, 166 and 168 which each respectively retain an axle 170, 172, 174, 176 and 178 on which a rolling wheel 180, 182, 184, 186 and 188 is positioned. This portion is also a standard feature of a trash can dolly and is not unique to the present invention. The selection of five (5) wheels is arbitrary and the trash can retaining section 20 may have at least three (3) and possibly more than five (5) wheels. Described broadly, this portion of the apparatus can be described as a trash can retaining section 20 having an upper surface 130 on which an object such as a trash can is retained and a lower surface 140 having means (150, 152, 154, 156, 158, 160, 162, 164, 166, 168, 170, 172, 174, 176, 178, 180, 182, 184, 186 and 188) by which the dolly 10 is rolled from one location to another.

Referring to FIGS. 5 through 8, the mop bucket 70 has a multiplicity of vertical walls such as four walls, a first lengthwise wall 300, a second lengthwise wall 310, a first transverse front wall 320 and a second transverse rear wall 330. The bucket has a base 340 with an upper surface 342. The four walls 300, 310, 320 and 330 and upper surface 342 of base 340 define and surround an interior chamber 322 which retains water and detergent and into which the strands of a mop are immersed. In general this is conventional for a mop bucket and may broadly be defined as a mop bucket cleaning water retaining chamber 322 formed by an upper surface 342 of a base 340 and surrounding walls (such as 300, 310, 320, and 330). A mop wringer 332 rests on the second transverse rear wall 330. Referring FIG. 5, the mop bucket 70 has spaced apart means by which the mop bucket 70 is rolled from one location to another. The means may include a pair of spaced apart front wheel assemblies including first front wheel support bracket retaining member 350 which receives first front wheel support bracket 360 which retains first front wheel axle 370 on which first front rolling wheel 380 is positioned. Similarly, second front wheel support bracket retaining member 352 receives second front wheel support bracket 362 which retains second front wheel axle 372 on which second front rolling wheel 382 is positioned. The means may also include a pair of spaced apart rear wheel assemblies including first rear wheel support bracket retaining member 354 which receives first rear wheel support bracket 364 which retains first rear wheel axle 374 on which first rear rolling wheel 384 is positioned. Similarly, second rear wheel support bracket retaining member 356 receives second rear wheel support bracket 366 which retains second rear wheel axle 376 on which second rear rolling wheel 386 is positioned.

Figure 5:
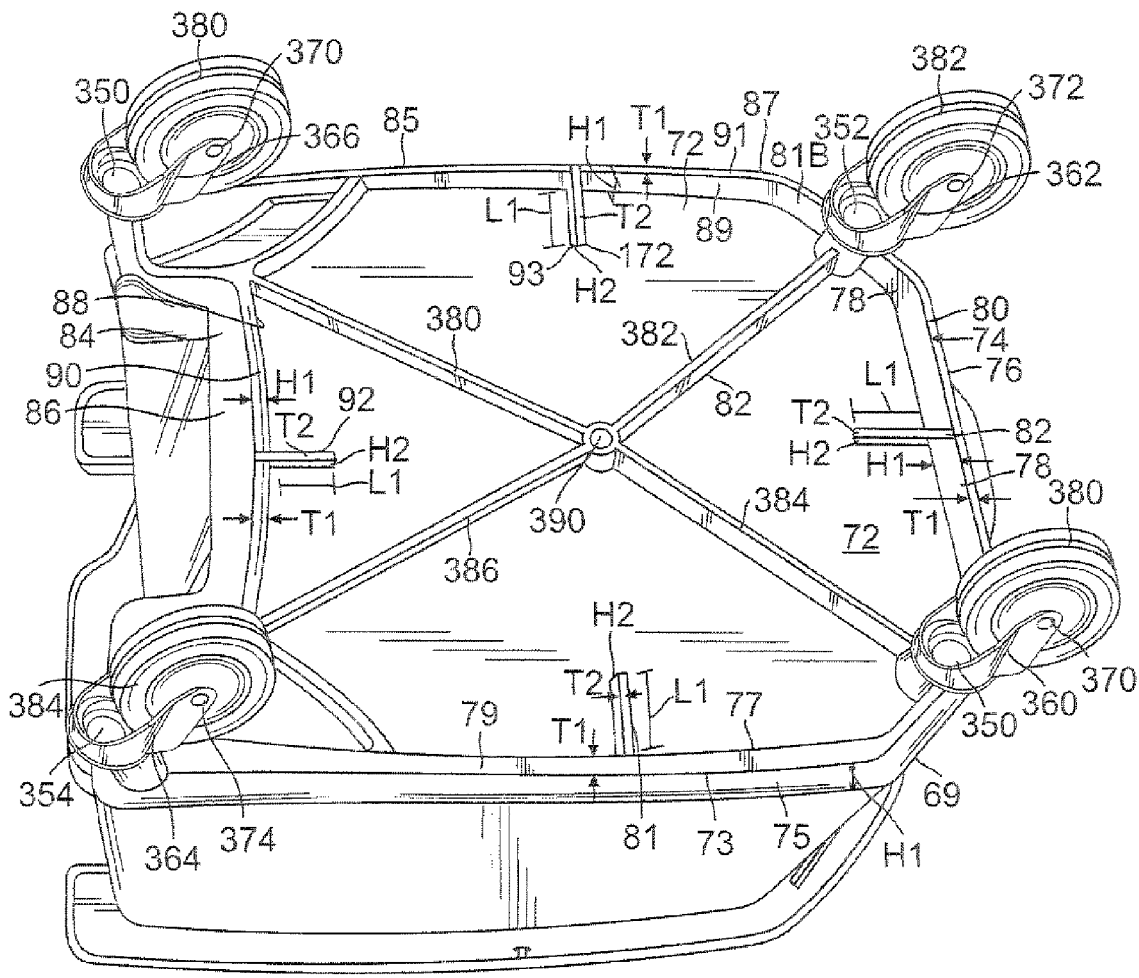
FIG. 5 is a bottom perspective view of the present invention mop bucket.
Figure 6:
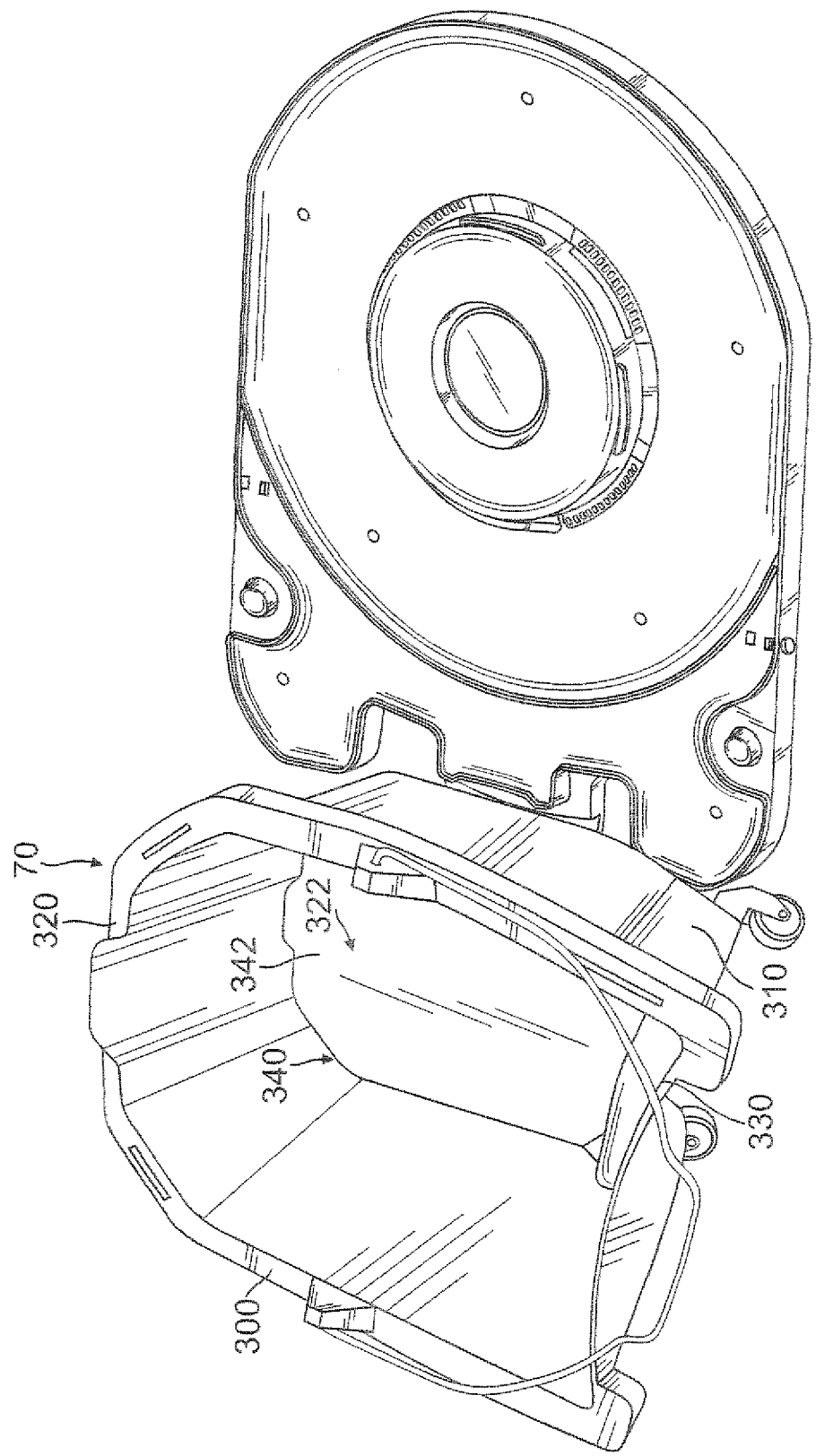
FIG. 6 is a top perspective view of the present invention trash can dolly connected to a sidewall of one lengthwise side of the present invention mop bucket, also illustrating a mop wringer sitting on t mop bucket.

The innovations of the present invention will now be described. Referring to FIG. 5, the base 340 has a bottom surface 72. A front base wall 74 extends from bottom surface 72. Front base wall 74 has an exterior surface 76, an interior surface 78, a bottom surface 80 of a given thickness "T1", the front base wall 74 having a given height "H1". A front retaining rib 82 extends from interior surface 78 over bottom surface 72 of base 340 for a distance "L1" toward center 390 of base 340 and has a given thickness "T2" and height "H2" which is approximately one-quarter of an inch taller than "H1". A rear base wall 84 extends from bottom surface 72. Rear base wall 84 has an exterior surface 86, an interior surface 88, a bottom surface 90 of a given thickness "T1", the rear base wall 84 having a given height "H1". A rear retaining rib 92 extends from interior surface 88 over bottom surface 72 of base 340 for a distance "L1" toward center 390 and has a given thickness "T2" and height "H2" which is approximately one-quarter of an inch taller than "H1". A first sidewall 73 extends from bottom surface 72. First sidewall 73 has an exterior surface 75, an interior surface 77, a bottom surface 79 of a given thickness "T1", the first sidewall 73 has a given height "H1". A first side retaining rib 81 extends from interior surface 77 over bottom surface 72 of base 340 for a distance "L1" toward center 390 and has a given thickness "T2" and height "H2" which is approximately one-quarter of an inch taller than "H1". A second sidewall 85 extends from bottom surface 72. Second sidewall 85 has an exterior surface 87, an interior surface 89, a bottom surface 91 of a given thickness "T1", the second sidewall 85 has a given height "H1". A second side retaining rib 93 extends from interior surface 89 over bottom surface 72 of base 340 for a distance "L1" toward center 390 and has a given thickness "T2" and height "H2" which is approximately one-quarter of an inch taller than "H1". The length of ribs 82, 92, 81 and 93 can be of different lengths and thicknesses.

Cross ribs 380, 382, 384 and 386 provide strength and extend across centerpoint 390 of base 340. First interconnecting wall 69 is between walls 73 and 74 and second interconnecting wall 81 is between walls 74 and 85. Walls 69, 73, 74, 81 and 85 are aligned.

Referring to FIGS. 1 through 4, dolly 10 has an interconnecting section 30 which has a fixed section 32 formed integral with trash can retaining section 20. Trash can retaining section 20 of dolly 10 has a circumferential sidewall formed with a rear wall 12, a front wall 14, a first sidewall 16 and a second sidewall 18. Fixed section 32 has an upper fixed section 34 having a rear wall 36 aligned with front wall 14 and extending from front wall 14. Fixed section 32 has a lower fixed section 38 having a portion of its sidewalls 46 and 50 of the lower fixed section 38 formed integral with sidewalls 16 and 18 of section 20. Sidewall 46 has a pin receiving opening 46B. Sidewall 50 has a pin receiving opening SOB. Lower fixed section 38 has a bottom surface 40 having a pair of spaced apart wheel retaining assemblies including wheel support bracket retaining members 31 and 39 which each respectively receiving a wheel support bracket 33 and 41 which each respectively retain an axle 35 and 43 on which a rolling wheel 37 and 45 is positioned. These assemblies are more broadly referred to as means by which the interconnecting section is rolled from one location to another. Wheels 37 and 45 are aligned with wheels 180, 182, 184 186 and 188 of trash can retaining section 20 and all wheels roll concurrently as the dolly 10 is rolled from one location to another. The wheels 37 an 45 are positioned on opposite sides of the fixed section 32 to provide stability. The upper fixed section 34 has an upper surface 42 which is aligned with upper surface 132 of trash can retaining section 20. The upper fixed section 34 has a first sidewall recess 44 extending inwardly from first sidewall 46A and a parallel oppositely disposed sidewall recess 48 extending inwardly from second sidewall 50A. First sidewall 46A has a first pin receiving channel 51 and second sidewall 50A has a second pin receiving channel 53, each channel located adjacent the front wall 14 of section 20. The fixed bottom section 38 has a first transverse opening 62 extending through the section and aligned with first sidewall recess 44 and also has a second transverse opening 64 extending through lower fixed section 38 and aligned with second sidewall recess 48.

Figure 1:
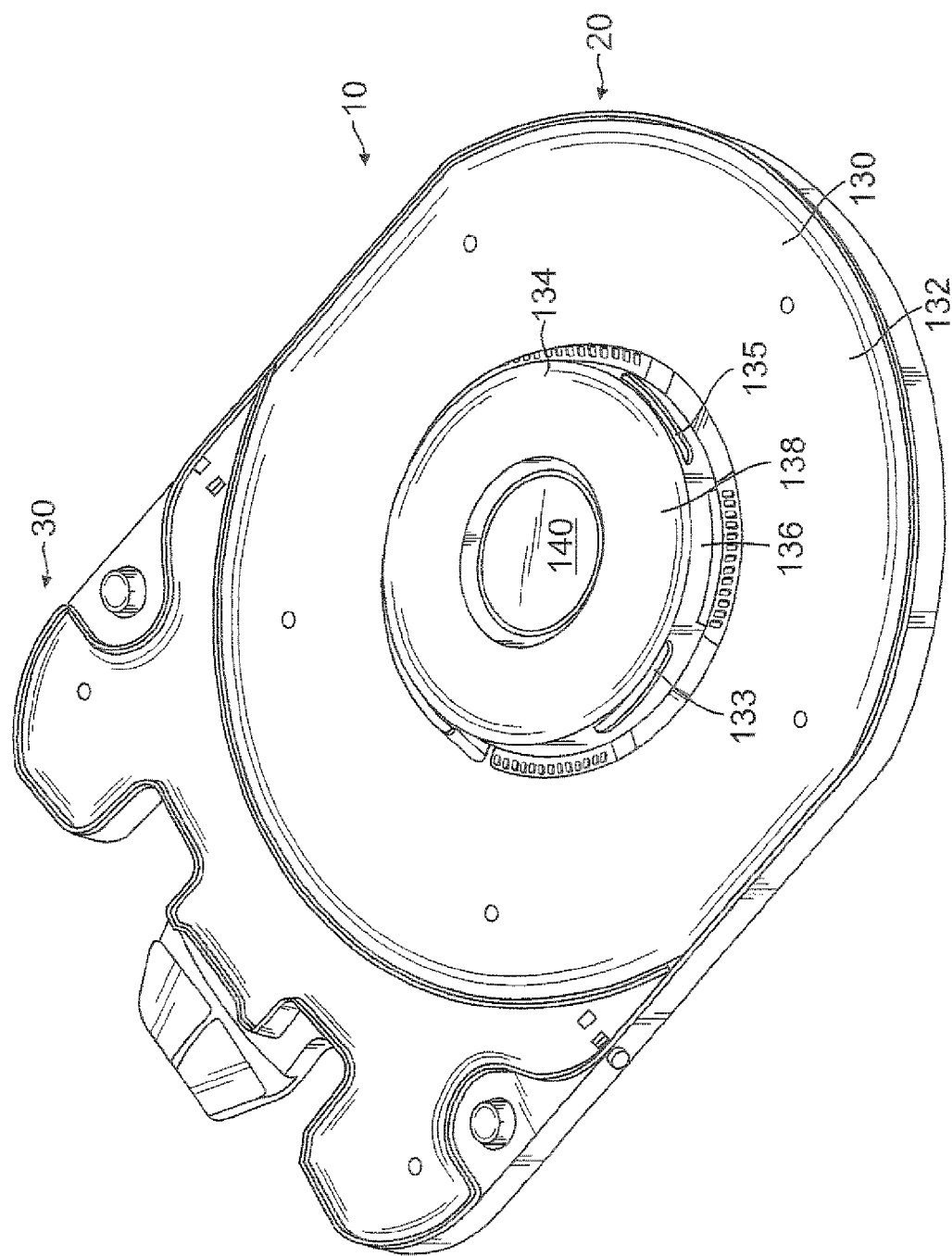
FIG. 1 is a top perspective view of the present invention trash can dolly and attached interconnecting member.
Figure 2:
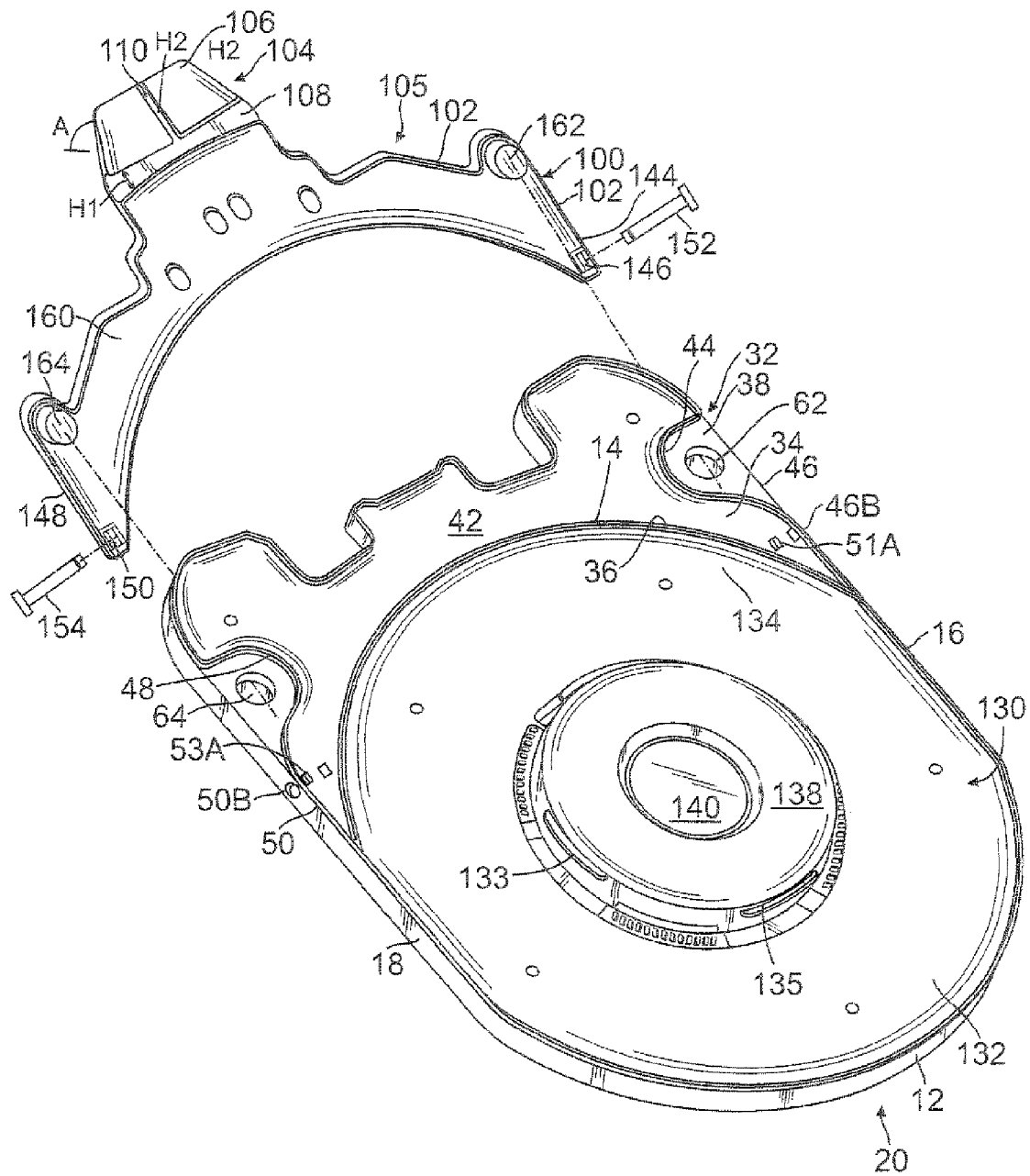
FIG. 2 is an exploded top perspective view of the present invention trash can dolly with the interconnecting member removed.
Figure 3:
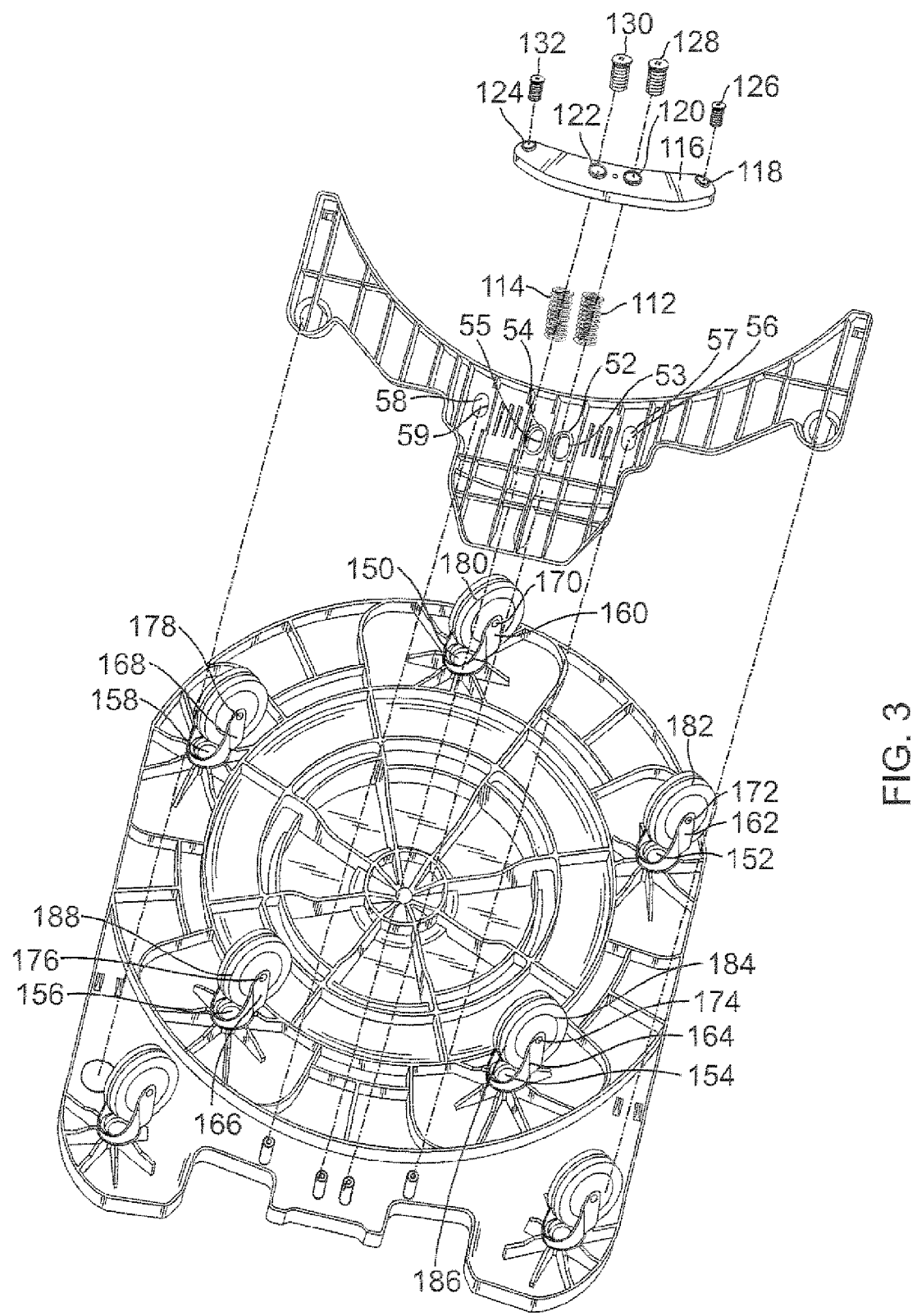
FIG. 3 is an exploded bottom perspective view of the present invention trash can dolly with the interconnecting member removed and illustrating the fastening members by which the interconnecting member is attached to the trash can dolly and also illustrating the return force springs.
Figure 4:
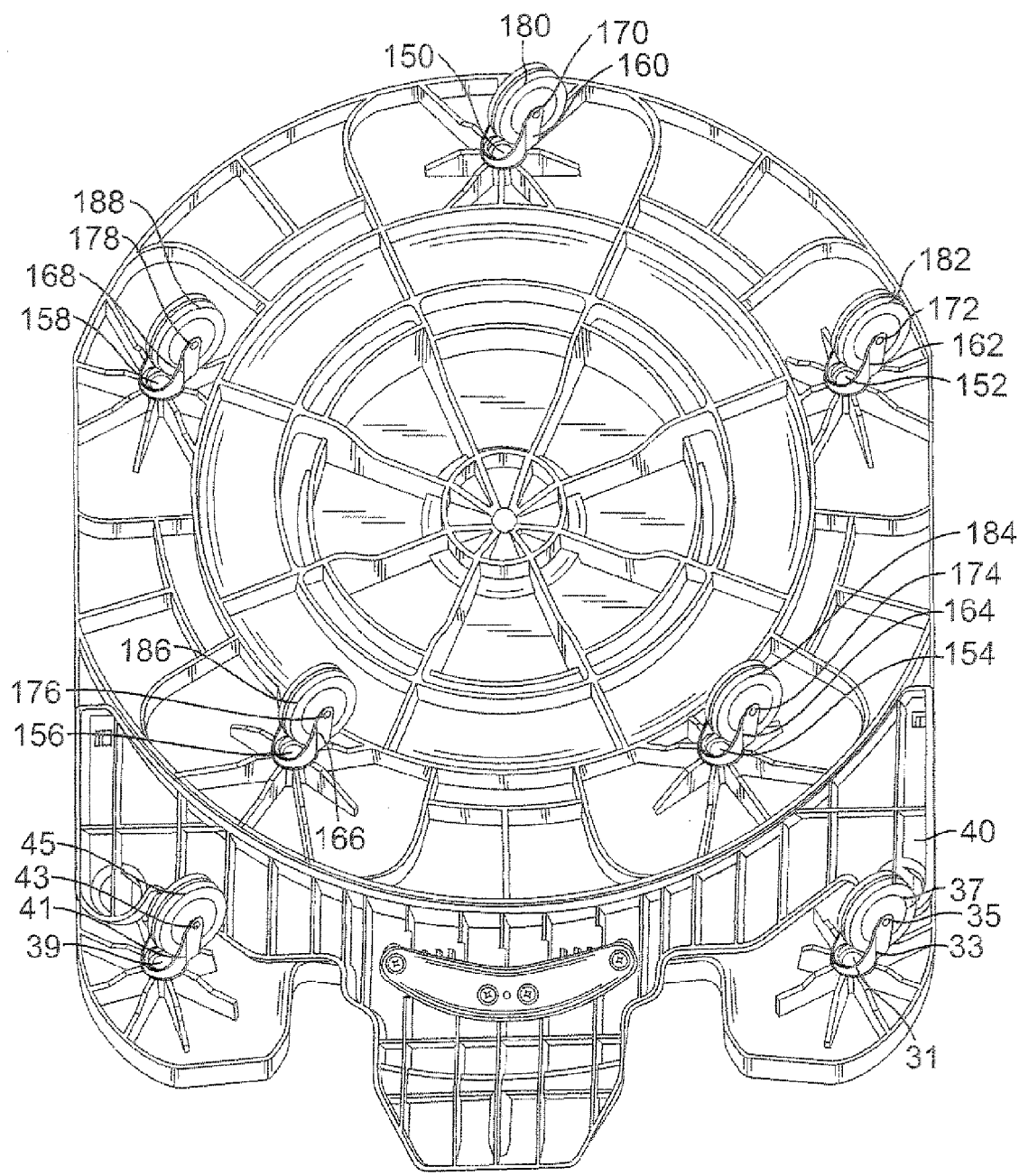
FIG. 4 is a bottom perspective view of the present invention trash can dolly and attached interconnecting member.

Referring to FIG. 3, formed into lower surface 38A of lower fixed section 38 are a pair of spring bosses 52 and 54 respectively having internal threads 53 and 55 and a pair of fastening bosses 56 and 58 having internal threads 57 and 59.

Interconnecting section 30 has a movable section 100 having a body 102 including front ramp section 104 positioned in front of the fixed section 32, the ramp section 104 has an inclined upper surface 106 with a downwardly extending angle "A", a transverse channel 108 having a depth of approximately "H1" and a longitudinal centrally disposed channel 110 having a depth of approximately "H2". A pair of springs 112 and 114 are supported by spring bosses 52 and 54 and a plate 116 having a multiplicity of openings 118, 120, 122, and 124 enable threaded fastening bolts 126, 128, 130 and 132 to respectively be threadedly engaged into respectively female threads of 57, 53, 55 and 59 of bosses 56, 52, 54 and 58. Body 102 has a first sidewall 144 having a transverse opening 146 and second sidewall 148 having a transverse opening 150. Movable section 100 is aligned with fixed section 30 so that opening 146 is aligned with pin receiving opening 40B and first pin receiving channel 51A and opening 150 is aligned with pin receiving opening 50B and second pin receiving channel 53A. A first connecting pin 152 extends through pin receiving opening 46B, first pin receiving channel 51A and opening 146 and a second connecting pin 154 extends through pin receiving opening 50B, second pin receiving channel 53A and opening 150. Moveable section 100 is therefore rotatably affixed to fixed section 30 and rotatable about connecting pins 152 and 154. Moveable section 100 has a body top surface 160 with a first foot push button 162 affixed to the top surface 160 and aligned with transverse opening 62 and an oppositely disposed second foot push button 164 affixed to the top surface 60 and aligned with transverse opening 64.

When assembled, the movable section 100 of interconnecting section 30 is rotatably affixed to the fixed second 32 of interconnecting section 30. A downwardly force on either foot push button 162 or 164 will overcome the force of return coil springs 112 and 114 and cause the movable section 100 to rotate about connecting pins 152 and 154 so that ramp section 104 rotates downwardly. Movable section 100 is aligned with the walls 300, 310 320, 330 of the mop bucket 70. The dolly 10 is rolled relative to the mop bucket 70 so that the front ramp section 104 is aligned with one of the mop bucket walls. The dolly 10 is rolled and a force is exerted on one of the foot pushbuttons 162 or 164 so that the ramp 104 rotates downwardly relative to the mop bucket 70. The ramp section 104 is rolled under the mop bucket 70 so that it transverse channel 108 is aligned with a wall 300, 310, 320 or 330 of the mop bucket 70 and its longitudinal channel 110 is aligned with a corresponding retaining rib 82, 92, 81 or 93 on the mop bucket 70.

Figure 7:
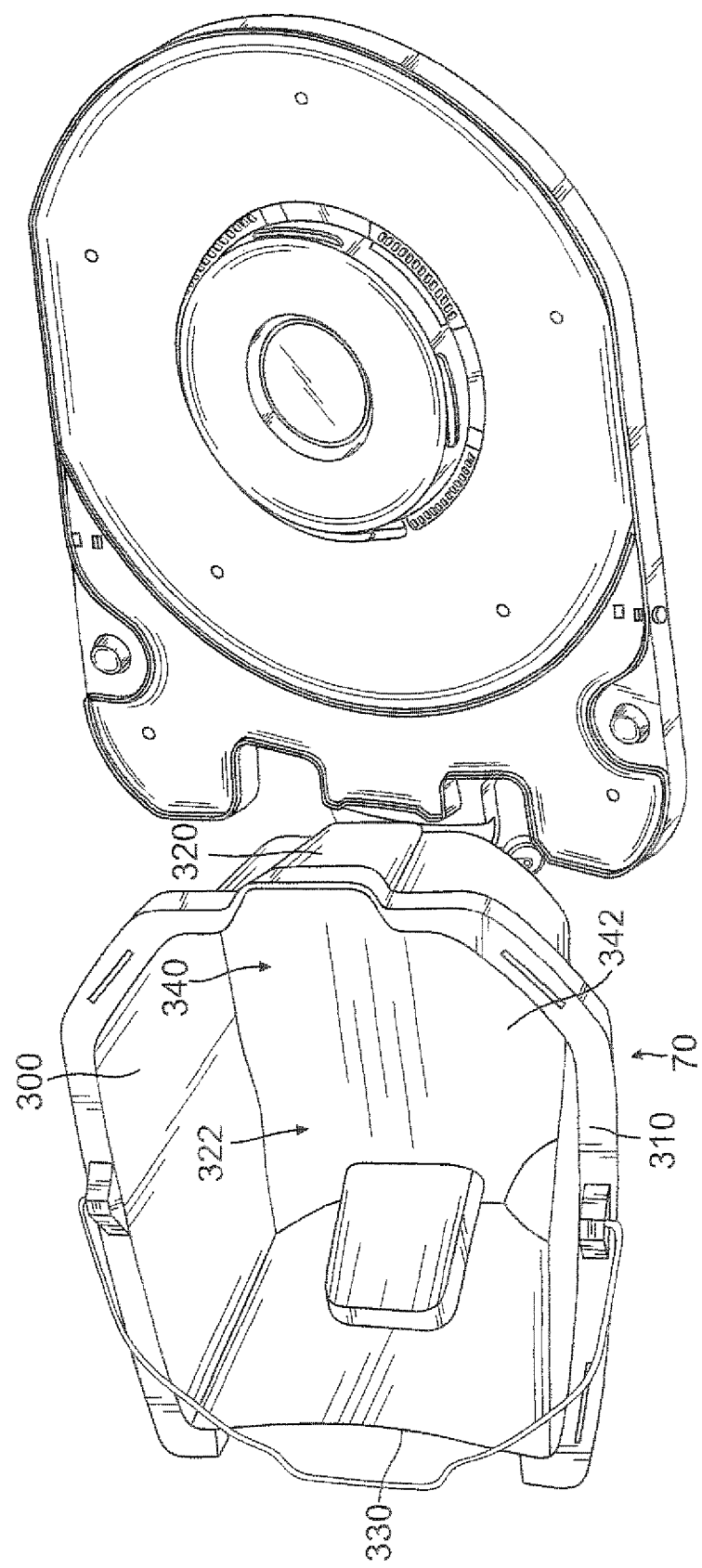
FIG. 7 is a top perspective view of the present invention trash can dolly connected to the front base wall of the present invention mop bucket, also illustrating a mop wringer sitting on the mop bucket.

As illustrated in FIG. 7, the dolly 10 is rolled relative to the mop bucket 70 so that the dolly 10 is aligned with mop bucket front transverse wall 320 and front base wall 74, then upon a downward force on either push button 162 or 164, ramp section 104 rotates in a counter-clockwise direction until ramp section upper surface 106 is below bottom surface 80 of front base wall 74 and the dolly 10 rolled until transverse channel 108 is aligned with bottom surface 80 and longitudinal centrally disposed channel 110 is aligned with front retaining rib 82. The force on the push button is 162 or 164 is released and the springs 114 and 116 cause the movable section 100 and ramp 104 to rotate in the clockwise direction. Front base wall 74 is engaged into and retained in transverse opening 108 and front retaining rib 82 is engaged into and retained in longitudinal channel 110. In this way, the dolly 10 and mop bucket 70 are retained together and can be jointly rolled to a cleaning location. The heavy mop bucket 70 with water does not have to be lifted to engaged the dolly 10. The two are engaged with a simple rolling motion.

Figure 8:
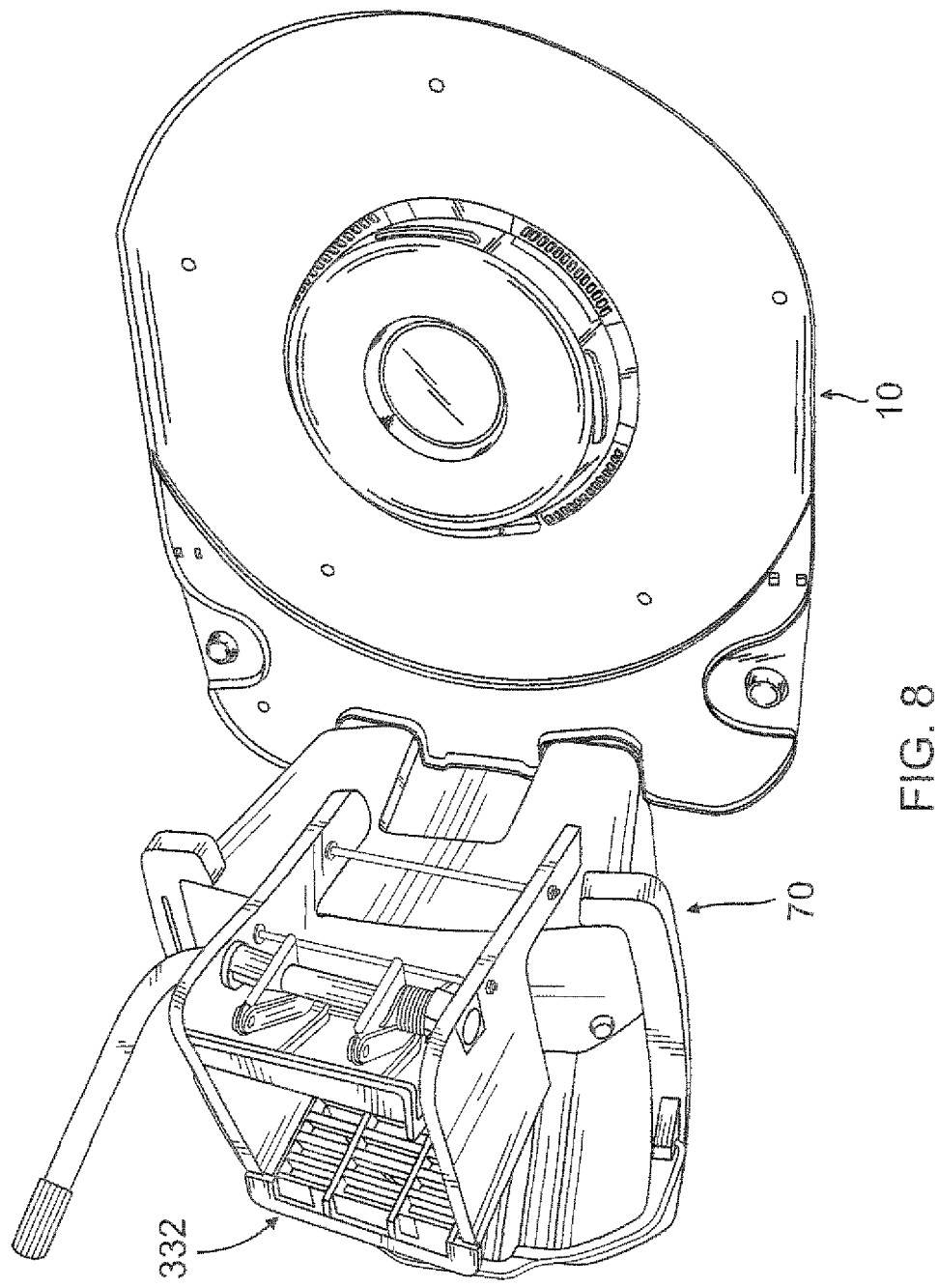
FIG. 8 is a top perspective view of the present invention trash can dolly connected to the rear base wall of the present invention mop bucket.

As illustrated in FIG. 8, the dolly 10 is rolled relative to the mop bucket 70 so that the dolly is aligned with the mop bucket rear transverse wall 330 and rear base wall 84, then upon a downward force on either push button 162 or 164, ramp section 104 rotates in a clockwise direction until ramp section upper surface 106 is below bottom surface 90 of rear base wall 84 and the dolly 10 is rolled until transverse channel 18 is aligned with bottom surface 90 and longitudinally disposed channel 110 is aligned with rear retaining rib 92. The force on the push button 162 or 164 is released and the springs 114 and 116 cause the movable section 100 and ramp section 104 to rotate in the counterclockwise direction. Rear base wall 84 is engaged into and retained in transverse opening 108 and rear retaining rib 92 is engaged into and retained in longitudinal channel 110. In this way, the dolly 10 and mop bucket 70 are retained together and can be jointly rolled to a cleaning location. The heavy mop bucket 70 with water does not have to be lifted to engage the dolly 10. The two are engaged with a simple rolling motion.

If the dolly 10 is rolled relative to the mop bucket 70 so that the dolly 10 is aligned with mop bucket first lengthwise wall 300 and first sidewall 73, then upon a downward force on either push button 162 or 164, ramp section 104 rotates in a clockwise direction until ramp section upper surface 106 is below bottom surface 79 of first lengthwise sidewall 73 and the dolly 10 rolled until transverse channel 108 is aligned with bottom surface 79 and longitudinal centrally disposed channel 110 is aligned with first side retaining rib 81. The force on the push button is 162 or 164 is released and the springs 114 and 116 cause the movable section 100 and ramp 104 to rotate in the counter-clockwise direction. First sidewall 73 is engaged into and retained in transverse opening 108 and first side retaining rib 81 is engaged into and retained in longitudinal channel 110. In this way, the dolly 10 and mop bucket 70 are retained together and can be jointly rolled to a cleaning location. The heavy mop bucket 70 with water does not have to be lifted to engaged the dolly 10. The two are engaged with a simple rolling motion.

If the dolly 10 is rolled relative to the mop bucket 70 so that the dolly 10 is aligned with mop bucket second lengthwise wall 310 and second lengthwise sidewall 85, then upon a downward force on either push button 162 or 164, ramp section 104 rotates in a counter-clockwise direction until ramp section upper surface 106 is below bottom surface 91 of second lengthwise wall 85 and the dolly 10 rolled until transverse channel 108 is aligned with bottom surface 91 and longitudinal centrally disposed channel 110 is aligned with second side retaining rib 93. The force on the push button is 162 or 164 is released and the springs 114 and 116 cause the movable section 100 and ramp 104 to rotate in the clockwise direction. Second sidewall 85 is engaged into and retained in transverse opening 108 and second side retaining rib 93 is engaged into and retained in longitudinal channel 110. In this way, the dolly 10 and mop bucket 70 are retained together and can be jointly rolled to a cleaning location. The heavy mop bucket 70 with water does not have to be lifted to engaged the dolly 10. The two are engaged with a simple rolling motion.

For engagement with the front and rear of the mop bucket, the engagement of the retaining rib is an extra safety precaution. The engagement of just the front base wall 74 or rear base wall 84 is usually sufficient. For engagement of the first sidewall 73 or second sidewall 85, the engagement of the retaining rib 81 or 93 is necessary because the distance of the lengthwise side of the mop bucket is long enough that the dolly 10 could move along the sidewalls 73 and 85 but the transverse grip of the retaining rib prevents this motion.

Referring to FIGS. 10 through 13, the base platform 1010 which is the base of a janitorial cart has an interconnecting section 1030 which has a fixed section 1032 formed integral as part of the janitorial cart. The base platform 1010 has a circumferential sidewall formed with a rear wall 1012, a front wall 1014, a first sidewall 1016 and a second sidewall 1018. The front portion of base 1010 has an integral front fixed section 1032 which has an upper fixed section 1034 aligned with front wall 1014 and extending from front wall 1014. Fixed section 1032 has a portion of its sidewalls 1046 and 1050 integral with sidewalls 1016 and 1018 of section 1010. Sidewall 1016 has a pin receiving opening 1046B. Sidewall 1018 has a pin receiving opening 1050B. Lower fixed section 1038 has a bottom surface 1040 having a pair of spaced apart wheel retaining assemblies including wheel support bracket retaining members 1031 and 1039 which each respectively receiving a wheel support bracket 1033 and 1041 which each respectively retain an axle 1035 and 1043 on which rolling wheels 1037 and 1045 are positioned. These assemblies are more broadly referred to as means by which the interconnecting section is rolled from one location to another. Wheels 1037 and 1045 are aligned with wheels 1080, 1082, 1084 and 1086 on the underside 1088 of base platform 1010 and all wheels roll concurrently as the base platform 1010 is rolled from one location to another. Rear wheels 1084 and 1086 are connected by extended axle 1086A supported by interior bosses 1086AA an 1086BB. Wheels 1080 and 1082 are supported by comparable axle and bracket assemblies as previously describe for wheels 1037 and 1039. The wheels 1037 and 1045 are positioned on opposite sides of the fixed section 1032 to provide stability. The upper fixed section 1034 has an upper surface 1042 which is aligned with upper surface 1020 of base platform 1010. The upper fixed section 1034 has a first sidewall exterior 1044 and a parallel oppositely disposed sidewall exterior 1048 extending inwardly from second sidewall 1050. First sidewall 1046 has a first pin receiving channel 1051 and second sidewall 1050 has a second pin receiving channel 1053 each channel located adjacent the front wall 1014 of section 1030.

Figure 12:
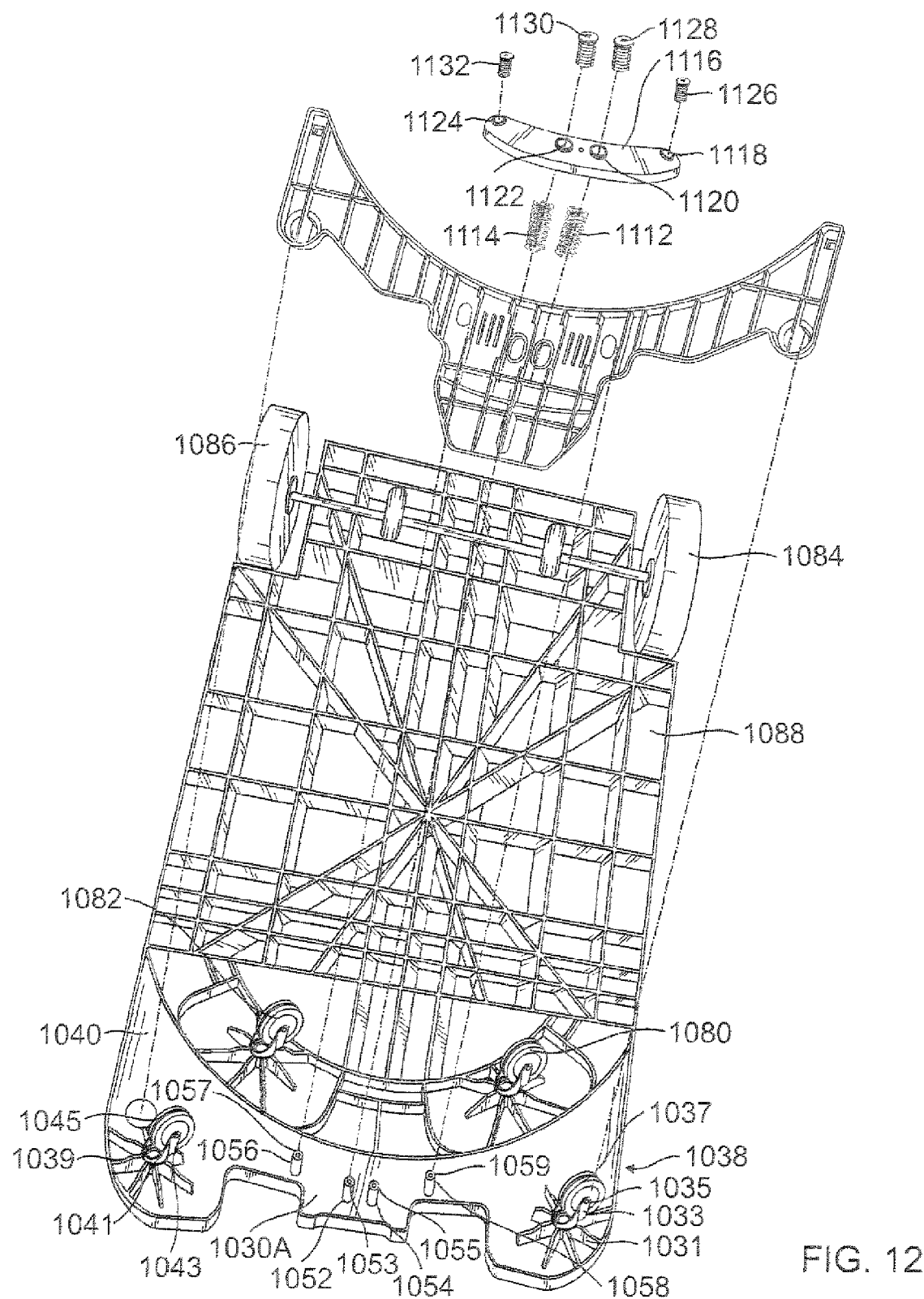
FIG. 12 is an exploded bottom perspective view of the present invention base platform of a janitorial cart with the interconnecting member removed and illustrating the fastening members by which the interconnecting member is attached to the base platform of the janitorial cart and also illustrating the return force springs.
Figure 13:
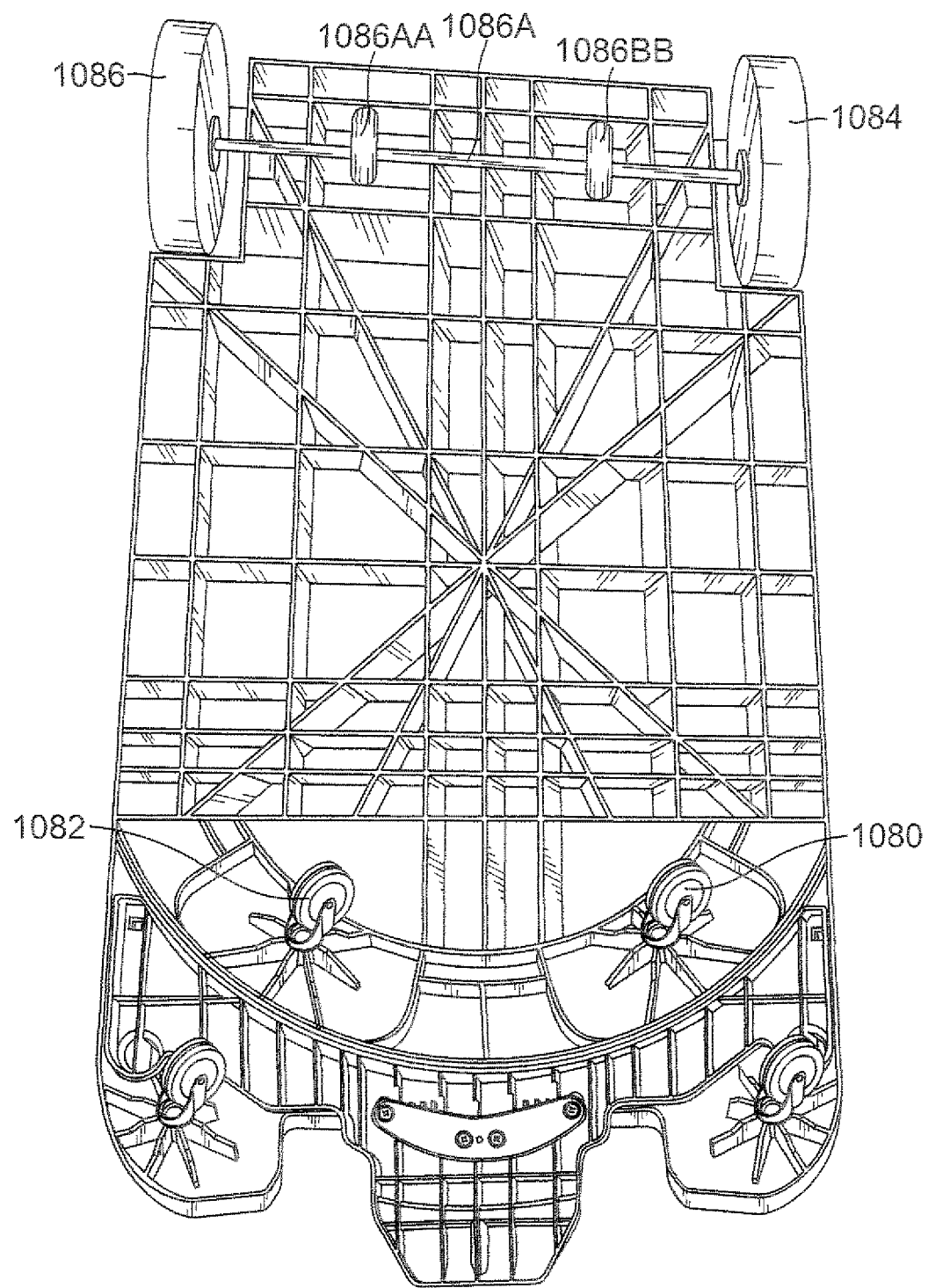
FIG. 13 is a bottom perspective view of the present invention base platform of the janitorial cart and attached interconnecting member.

Referring to FIG. 12, formed into underside 1030A of lower surface 1030 of lower fixed section 1034 are a pair of spring bosses 1052 and 1054 respectively having internal threads 1053 and 1055 and a pair of fastening bosses 1056 and 1058 having internal threads 1057 and 1059.

Interconnecting section 1030 has a movable section 1100 having a body 1102 including front ramp section 1104 positioned in front of the fixed section 1032, the ramp section 1104 has an inclined upper surface 1106 with a downwardly extending angle "A", a transverse channel 1108 having a depth of approximately "H1" and a longitudinal centrally disposed channel 1110 having a depth of approximately "H2". A pair of springs 1112 and 1114 are supported by spring bosses 1054 and 1052 and a plate 1116 having a multiplicity of openings 1118, 1120, 1122, and 1124 enable threaded fastening bolts 1126, 1128, 1130 and 1132 to respectively be threadedly engaged into respectively female threads of 1059, 1055, 1053, 1057, of bosses 1058, 1054, 1052, 1056. Body 1102 has a first sidewall 1144 having a transverse opening 1146 and second sidewall 1148 having a transverse opening 1150. Movable section 1100 is aligned with fixed section 1130 so that opening 1146 is aligned with pin receiving opening 1046E and first pin receiving channel 1051A and opening 1150 is aligned with pin receiving opening 1150B and second pin receiving channel 1053A. A first connecting pin 1152 extends through pin receiving opening 1046B, first pin receiving channel 1051A and opening 1146 and a second connecting pin 1154 extends through pin receiving opening 10150B, second pin receiving channel 1053A and opening 1150. Moveable section 1100 is therefore rotatably affixed to fixed section 1130 and rotatable about connecting pins 1152 and 1154. Moveable section 1100 has a body top surface 1160 with a first foot pushbutton 1162 affixed to the top surface 1160 and aligned with transverse opening 1165 and an oppositely disposed second foot pushbutton 1164 affixed to the top surface 1160 and aligned with transverse opening 1163. Fixed section 1132 is affixed onto base platform 1010.

When assembled, the movable section 1100 of interconnecting section 1030 is rotatably affixed to the fixed second 1032 of interconnecting section 1030. A downward force on either foot push button 1162 or 1164 will overcome the force of return coil springs 1112 and 1114 and cause the movable section 1100 to rotate about connecting pins 1152 and 1154 so that ramp section 1104 rotates downwardly. Movable section 1100 is aligned with the walls 300A, 310A, 320A, 330A of the mop bucket 70. The base plate 1010 is rolled relative to the mop bucket 70 so that the front ramp section 1104 is aligned with one of the mop bucket walls. The base plate 1010 is rolled and a force is exerted on one of the foot pushbuttons 1162 or 1164 so that the ramp 1104 rotates downwardly relative to the mop bucket 70A. The ramp section 1104 is rolled under the mop bucket 70A so that its transverse channel 1108 is aligned with a respective one of wall 300A, 310A, 320A or 330A of the mop bucket 70A and its longitudinal channel 1110 is aligned with a corresponding respective retaining rib 82A, 92A, 81A or 93A on the mop bucket 70A.

Figure 14:
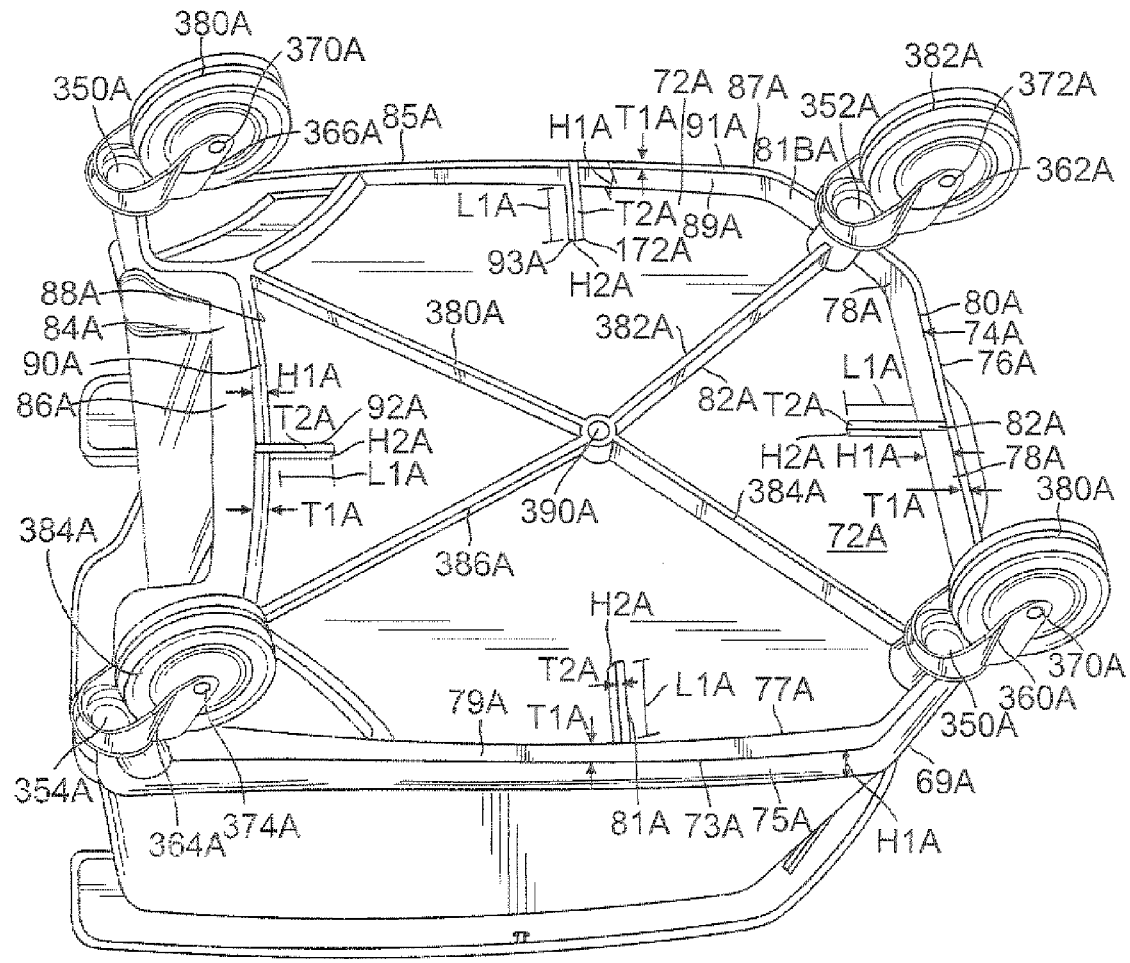
FIG. 14 is a bottom perspective view of the present invention mop bucket.
Figure 16:
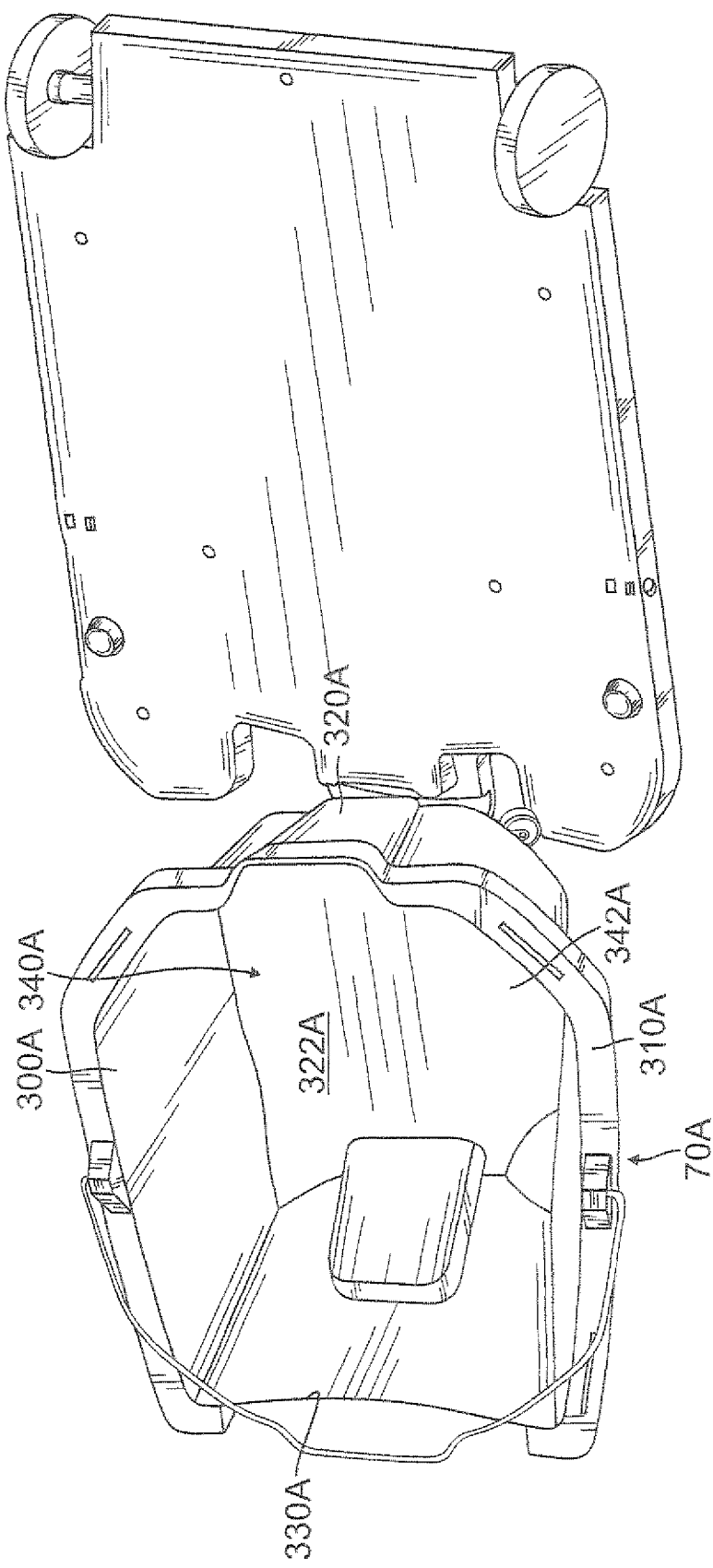
FIG. 16 is a top perspective view of the present invention base platform of the janitorial cart connected to the front base wall of the present invention mop bucket.

As illustrated in FIGS. 16 and 14, the base plate 1010 is rolled relative to the mop bucket 70A so that the baseplate 1010 is aligned with mop bucket front transverse wall 320A and front base wall 74A, then upon a downward force on either push button 1162 or 1164, ramp section 1104 rotates in a counter-clockwise direction until ramp section upper surface 1106 is below bottom surface 80A of front base wall 74A and the base plate 1010 rolled until transverse channel 1108 is aligned with bottom surface 80A and longitudinal centrally disposed channel 1110 is aligned with front retaining rib 82A. The force on the push button 1162 or 1164 is released and the springs 1114 and 1116 cause the movable section 1100 and ramp 1104 to rotate in the clockwise direction. Front base wall 74A is engaged into and retained in transverse opening 1108 and front retaining rib 82A is engaged into and retained in longitudinal channel 1110. In this way, the base plate 1010 and mop bucket 70A are retained together and can be jointly rolled to a cleaning location. The heavy mop bucket 70A with water does not have to be lifted to engage the base plate 1010. The two are engaged with a simple rolling motion.

Figure 17:
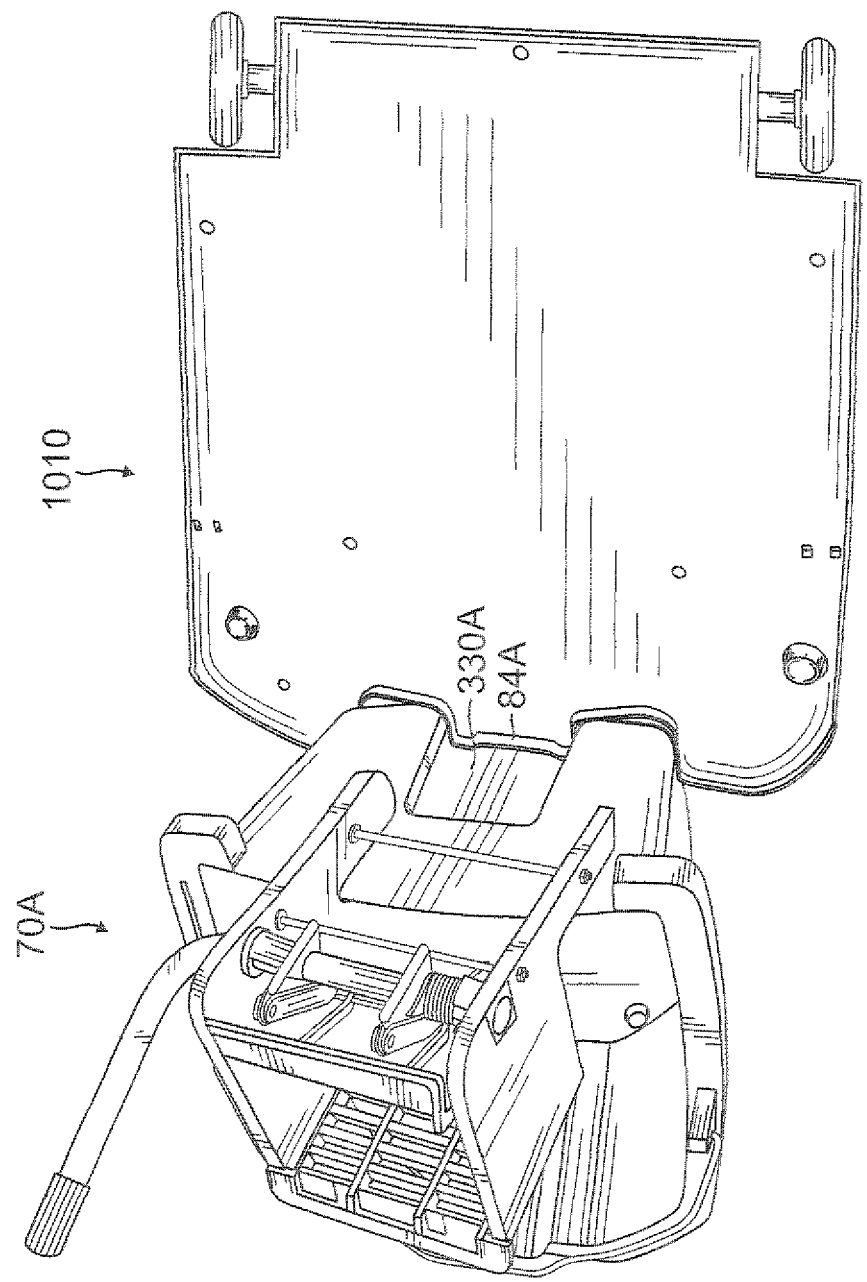
FIG. 17 is a top perspective view of the present invention base platform of the janitorial cart connected to the rear base wall of the present invention mop bucket, also illustrating a mop wringer sitting on the mop bucket.

As illustrated in FIG. 17, the janitorial cart base plate 1010 is rolled relative to the mop bucket 70A so that the dolly is aligned with the mop bucket rear transverse wall 330A and rear base wall 84A, then upon a downward force on either push button 1162 or 1164, ramp section 1104 rotates in a counter-clockwise direction until ramp section upper surface 1106 is below bottom surface 90A of rear base wall 84A and the base plate 1010 is rolled until transverse channel 1108 is aligned with bottom surface 90A and longitudinally disposed channel 1110 is aligned with rear retaining rib 92A. The force on the push button 1162 or 1164 is released and the springs 1114 and 1116 cause the movable section 1100 and ramp section 1104 to rotate in the counterclockwise direction. Rear base wall 84A is engaged into and retained in transverse opening 1108 and rear retaining rib 92A is engaged into and retained in longitudinal channel 1110. In this way, the base plate 1010 and mop bucket 70A are retained together and can be jointly rolled to a cleaning location. The heavy mop bucket 70A with water does not have to be lifted to engage the base plate 1010. The two are engaged with a simple rolling motion.

Figure 15:
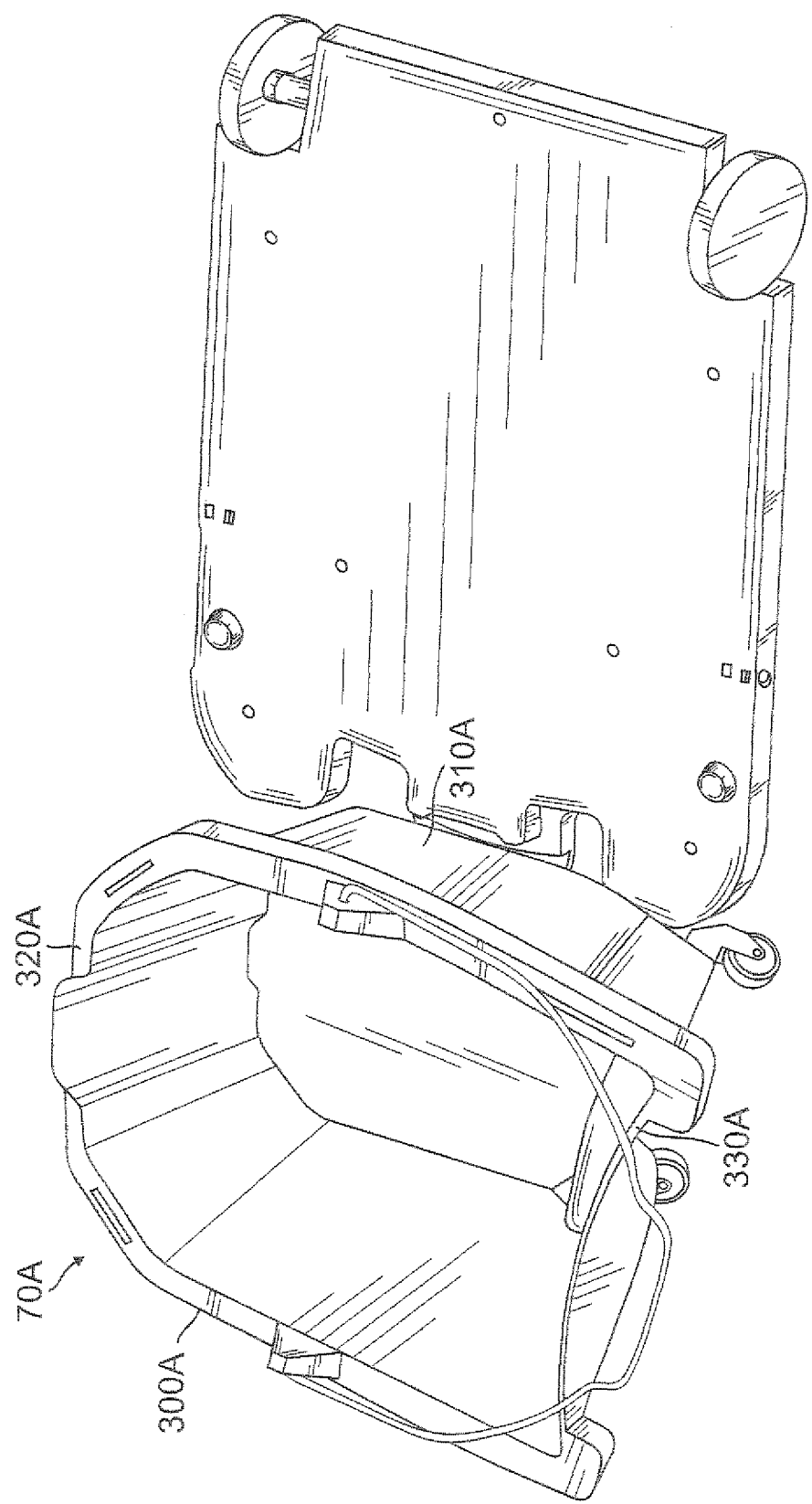
FIG. 15 is a top perspective view of the present invention base platform of the janitorial cart connected to a sidewall of one lengthwise side of the present invention mop bucket.

Referring to FIG. 15, if the base plate 1010 is rolled relative to the mop bucket 70A so that the base plate 1010 is aligned with mop bucket first lengthwise wall 310A and first sidewall 73A, then upon a downward force on either push button 1162 or 1164, ramp section 1104 rotates in a counter-clockwise direction until ramp section upper surface 1106 is below bottom surface 79A of first lengthwise sidewall 73A and the base plate 1010 rolled until transverse channel 1108 is aligned with bottom surface 79A and longitudinal centrally disposed channel 1110 is aligned with first side retaining rib 81A. The force on the pushbutton is 1162 or 1164 is released and the springs 1114 and 1116 cause the movable section 1100 and ramp 1104 to rotate in the counter-clockwise direction. First sidewall 73A is engaged into and retained in transverse opening 1108 and first side retaining rib 81A is engaged into and retained in longitudinal channel 1110. In this way, the base plate 1010 and mop bucket 70A are retained together and can be jointly rolled to a cleaning location. The heavy mop bucket 70 with water does not have to be lifted to engaged the base plate 1010. The two are engaged with a simple rolling motion.

If the base plate 1010 is rolled relative to the mop bucket 70A so that the base plate 1010 is aligned with mop bucket second lengthwise wall 300A and second lengthwise sidewall 85A, then upon a downward force on either push button 1162 or 1164, ramp section 1104 rotates in a counter-clockwise direction until ramp section upper surface 1106 is below bottom surface 91A of second lengthwise wall 85A and the base plate 1010 rolled until transverse channel 1108 is aligned with bottom surface 91A and longitudinal centrally disposed channel 1110 is aligned with second side retaining rib 93A. The force on the push button is 1162 or 1164 is released and the springs 1114 and 1116 cause the movable section 1100 and ramp 1104 to rotate in the clockwise direction. Second sidewall 1085 is engaged into and retained in transverse opening 1108 and second side retaining rib 93A is engaged into and retained in longitudinal channel 1110. In this way, the base plate 1010 and mop bucket 70A are retained together and can be jointly rolled to a cleaning location. The heavy mop bucket 70A with water does not have to be lifted to engaged the base plate 1010. The two are engaged with a simple rolling motion.

For engagement with one sidewall of the front and rear of the mop bucket, the engagement of the retaining rib is an extra safety precaution. The engagement of just the front base wall 74A or rear base wall 84A is usually sufficient. For engagement of the first sidewall 73A or second sidewall 85A, the engagement of the retaining rib 81A or 93A is necessary because the distance of the lengthwise side of the mop bucket is long enough that the base plate 1010 could move along the sidewalls 73A and 85A but the transverse grip of the retaining rib prevents this motion.

Figure 18:
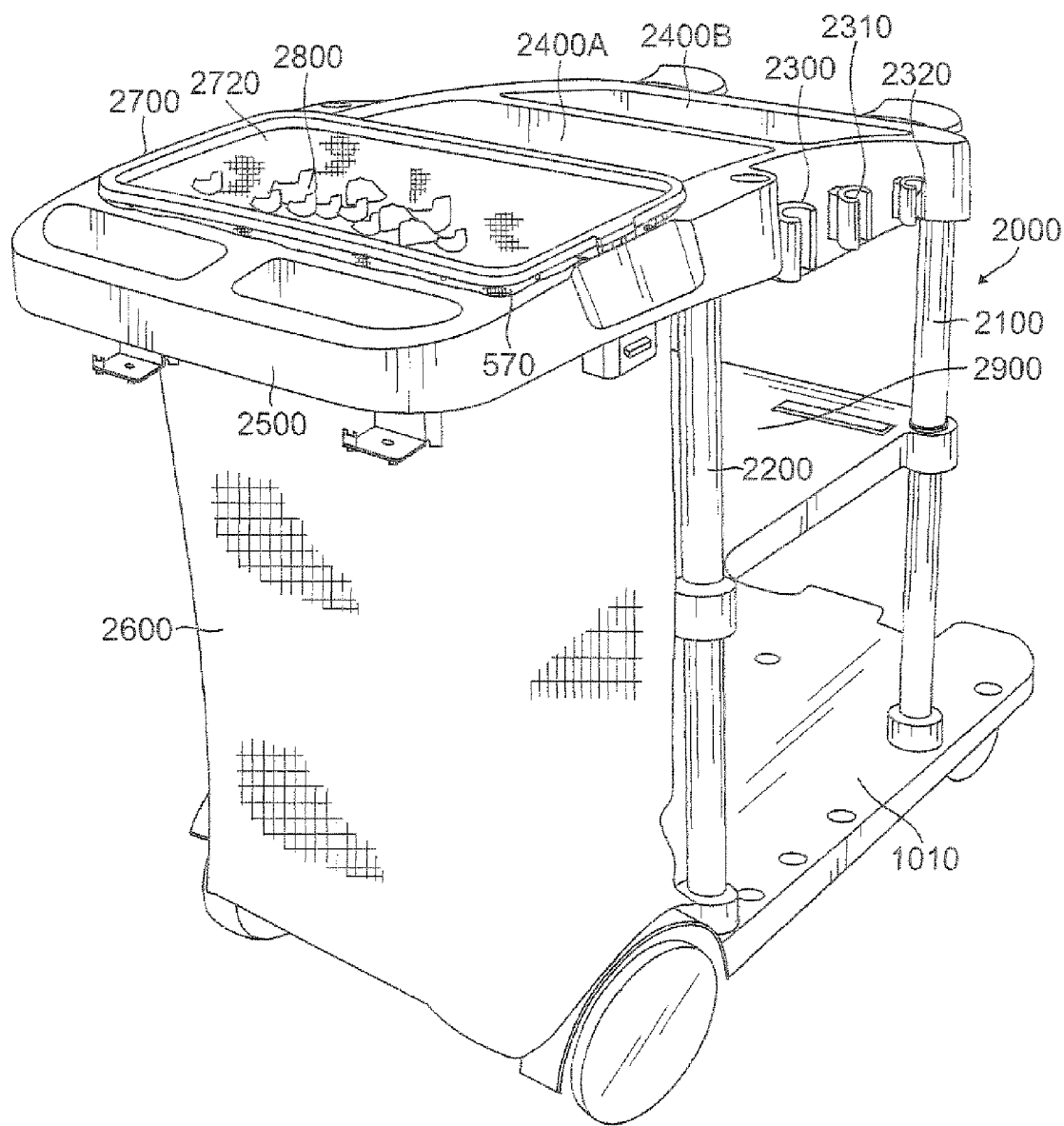
FIG. 18 is a top perspective view of the present invention janitorial cart affixed to its top base wall.

The base platform 1010 can accommodate any desired janitorial cart, Referring to FIG. 18, One example of a janitorial cart 2000 is illustrated and includes four posts, two of which 2100 and 2200 are illustrated with two respective parallel posts adjacent the opposite side of the cart. The posts support at least one shelf 2900. The janitorial cart 1010 further includes cleaning retaining members 2300, 2310 and 2320 used to retain the handles of mops and booms. Interior receptacles 2400A and 2400B can be used to retain cleaning supplies. The janitorial cart 2000 has handle 2500 and an upper rim 2700 which supports a fabric trash container 2600 including disposable trash bags 2720 into which trash 2800 is thrown.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

What is claimed is:

1. An apparatus for engaging a base platform of a janitorial cart with a mop bucket comprising:

a. the base platform of said janitorial cart including an interconnecting section which has a front fixed section formed integrally as part of the janitorial cart, the base platform having a circumferential sidewall formed with a rear wall, a front wall, a first sidewall and a second sidewall, a front section of the base platform including said front fixed section formed integrally as part of the janitorial cart and which has an upper fixed section aligned with the front wall and extending from the front wall, the front fixed section having a portion of a first sidewall integral with the first sidewall of the base platform and a portion of a second sidewall integral with the second sidewall of the base platform, the first sidewall of the base platform including a first pin receiving opening and the second sidewall of the base platform including a second pin receiving opening, the front fixed section of the base platform including a lower fixed section with a bottom surface having a first pair of spaced apart wheel retaining assemblies with each respective wheel retaining assembly including a wheel support bracket retaining an axle on which a rolling wheel is positioned, the base platform including a bottom, an area of the bottom adjacent said front fixed section formed integrally as part of the janitorial cart and including a second pair of spaced apart wheel retaining assemblies, each respective wheel retaining assembly including a wheel support bracket retaining an axle on which a rolling wheel is positioned, a rear portion of the bottom of the base platform supporting a pair of rear wheels connected by an extended axle supported by interior bosses, said upper fixed section formed integrally as part of the janitorial cart including an upper surface which is aligned with an upper surface of the base platform, the upper fixed section having a first sidewall exterior extending inwardly from the first sidewall and a parallel oppositely disposed second sidewall exterior extending inwardly from the second sidewall, the first sidewall having a first pin receiving channel and the second sidewall having a second pin receiving channel, each respective pin receiving channel located adjacent said front wall of the interconnecting section, formed into the underside of the lower surface of the lower fixed section are a pair of spring bosses respectively having internal threads and a pair of fastening bosses respectively having internal threads and located adjacent the front wall of the base platform;

b. the interconnecting section including a movable section having a body including a front movable ramp section positioned in front of a fixed section of the interconnecting section, the front movable ramp section having an inclined upper surface with a downwardly extending angle, a transverse channel having a first given depth and a longitudinal centrally disposed channel having a second given depth, a pair of return springs respectively supported by a respective one of the spring bosses and a plate having a multiplicity of openings to enable a respective one of a multiplicity of threaded fastening bolts to respectively be threadedly engaged into respective female threads of the respective spring bosses, the front movable ramp section having a body with a first sidewall having a transverse opening and second sidewall having a transverse opening, the front movable ramp section aligned with the fixed section of the interconnecting section so that a first opening in the front movable ramp section is aligned with the first pin receiving opening and the first pin receiving channel and a second opening in the front movable ramp section is aligned with the second pin receiving opening and the second pin receiving channel, a first connecting pin extends through the first pin receiving opening, the first pin receiving channel and the first opening in the front movable ramp section and a second connecting pin extends through the second pin receiving opening, the second pin receiving channel, and the second opening in the front movable ramp section so that the front moveable ramp section is rotatably affixed to the fixed section of the interconnecting section and rotatable about the first and second connecting pins, the front moveable ramp section has a body top surface with a first foot pushbutton affixed to the body top surface and aligned with a first transverse opening in the base platform and an oppositely disposed second foot pushbutton affixed to the top surface and aligned with a second transverse in the base platform, the fixed section of the interconnecting section is affixed onto the base platform;

c. wherein the front movable ramp section of the interconnecting section is rotatably affixed to the front fixed section formed integrally as part of the janitorial cart and of the interconnecting section so that a downward force on either foot push button will overcome the force of the return springs and cause the front movable ramp section to rotate about the connecting pins so that the front movable ramp section rotates downwardly, and when the downward force on the pushbutton is released, the front movable ramp rotates back to its original position;

d. the mop bucket having upper sidewalls surrounding an upper surface of a base to form a chamber for retaining liquid, the base having a multiplicity of spaced apart rolling wheels to enable the mop bucket to be rolled from one location to another;

e. the base of the mop bucket having a lower surface having a front base wall of a given first height and a given first thickness, a first retaining rib extending transversely from an interior wall of the front base wall for a given second distance toward a center of the mop bucket with the first retaining rib having a given second thickness, a rear base wall of the given first height and the given first thickness, a second retaining rib extending transversely from an interior wall of the rear base wall for the given second distance toward a center of the mop bucket with the second retaining rib having the given second thickness, a first sidewall of the given first height and the given first thickness, a first side retaining rib extending transversely from an interior wall of the first sidewall for the given second distance toward a center of the mop bucket with the first side retaining rib having the given second thickness, a second sidewall of the given first height and the given first thickness, a second side retaining rib extending transversely from an interior wall of the second sidewall for the given second distance toward a center of the mop bucket with the second side retaining rib having the given second thickness, the front base wall, rear base wall, first sidewall and second sidewall all aligned and all extending in a direction away from the lower surface of the base and in a direction away from the liquid retaining chamber; and f. wherein when the base platform is rolled relative to the mop bucket and a force exerted on one of the pushbuttons causes the moveable ramp section to rotate downwardly relative to the mop bucket, the ramp section is rolled under the mop bucket so that the transverse channel of the moveable ramp section is aligned with a respective one of the mop bucket walls and has a first given depth to receive the respective one of the mop bucket walls and the longitudinal centrally disposed channel of the movable ramp section is aligned with the respective retaining rib and has a given depth to receive the respective retaining rib, and when the force is released, the movable ramp section rotates upwardly so that the transverse channel retains the respective wall and the longitudinal channel retains the respective retaining rib of the mop bucket.

2. An apparatus for engaging a base platform of a janitorial cart with a mop bucket in accordance with claim 1, wherein a subsequent force exerted on one of the pushbuttons causes the movable ramp section to rotate downwardly and release the transverse channel retaining the respective wall and the longitudinal channel retaining the respective transverse retaining rib of the mop bucket to enable the base platform to be rolled away from the mop bucket.

3. The apparatus for engaging a base platform of a janitorial cart with a mop bucket in accordance with claim 1 further comprising a mop wringer retained on the mop bucket.

4. An apparatus for engaging a base platform of a janitorial cart with a mop bucket comprising:

a. the base platform of said janitorial cart including an interconnecting section which has a fixed section formed integrally as part of the janitorial cart, the base platform having a circumferential sidewall formed with a rear wall, a front wall, a first sidewall and a second sidewall, a front section of the base platform including said fixed section formed integrally with the janitorial cart which has an upper fixed section aligned with the front wall and extending from the front wall, a bottom of said fixed section formed integrally with said janitorial cart of the base platform and a bottom of the base platform respectively including a multiplicity of spaced apart wheel retaining assemblies with each respective wheel retaining assembly including a wheel support bracket retaining an axle on which a rolling wheel is positioned, a rear portion of the bottom of the base platform supporting a pair of rear wheels connected by an extended axle supported by interior bosses;

b. the interconnecting section including a movable section having a body including a front movable ramp section positioned in front of a fixed section of the interconnecting section, the front movable ramp section having an inclined upper surface with a downwardly extending angle, the front movable ramp section having a transverse channel having a first given depth and a longitudinal centrally disposed channel having a second given depth, at least one return spring supported under the front movable ramp section, the moveable section having a body top surface with at least a first foot pushbutton affixed to the top surface;

c. wherein the front movable ramp section of the interconnecting section is rotatably affixed to the fixed section of the interconnecting section so that a downward force on the at least one pushbutton will overcome the force of the at least one return spring and cause the front movable ramp section to rotate so that front movable ramp section rotates downwardly, and when the downward force on the at least one pushbutton is released, the front moveable ramp section rotates back to its original position;

d. the mop bucket having upper sidewalls surrounding an upper surface of a base to form a chamber for retaining liquid, the base including a multiplicity of spaced apart rolling wheels to enable the mop bucket to be rolled from one location to another;

e. the base of the mop bucket having a lower surface having at least one base wall of a given size and at least one transverse rib of a given size; and f. wherein when the base platform is rolled relative to the mop bucket and a force exerted on the at least one pushbutton causes the front moveable ramp section to rotate downwardly relative to the mop bucket, so that the front movable ramp section is rolled under the mop bucket so that the transverse channel of the front moveable ramp section is a aligned with the at least one base wall of the mop bucket and has a size to receive the at least one wall of the mop bucket and the longitudinal centrally disposed channel of the front movable ramp section is aligned with the at least one transverse rib of the mop bucket, and when the force is released, the front movable ramp section rotates upwardly so that the transverse channel retains the at least one wall and the longitudinal centrally disposed channel retains the at least one transverse rib of the mop bucket.

5. An apparatus for engaging a base platform of a janitorial cart with a mop bucket in accordance with claim 4, wherein a subsequent force exerted on the at least one pushbutton causes the movable ramp section to rotate downwardly and release the transverse channel retaining the at least one wall and the longitudinal channel retaining the transverse rib of the mop bucket to enable the base platform to be rolled away from the mop bucket.

6. The apparatus for engaging a base platform of a janitorial cart with a mop bucket in accordance with claim 4 further comprising a mop wringer retained on the mop bucket.

\* \* \* \* \*